US006503559B1

(12) United States Patent
Nohr et al.

(10) Patent No.: US 6,503,559 B1
(45) Date of Patent: Jan. 7, 2003

(54) NEONANOPLASTS AND MICROEMULSION TECHNOLOGY FOR INKS AND INK JET PRINTING

(75) Inventors: Ronald Sinclair Nohr, Alpharetta, GA (US); John Gavin MacDonald, Decatur, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/325,445

(22) Filed: Jun. 3, 1999

Related U.S. Application Data

(60) Provisional application No. 60/087,893, filed on Jun. 3, 1998.

(51) Int. Cl.[7] .................................................. B01J 13/02
(52) U.S. Cl. .............................. 427/213.33; 427/213.3; 427/213.31; 427/213.32; 427/213.34; 427/213.35; 427/213.36
(58) Field of Search ............. 427/213.3, 213.31–213.36

(56) References Cited

U.S. PATENT DOCUMENTS

| 575,228 A | 1/1897 | von Gallois |
|---|---|---|
| 582,853 A | 5/1897 | Feer |
| 893,636 A | 7/1908 | Maywald |
| 1,013,544 A | 1/1912 | Fuerth |
| 1,325,971 A | 12/1919 | Akashi |
| 1,364,406 A | 1/1921 | Olsen |
| 1,436,856 A | 11/1922 | Brenizer et al. |
| 1,744,149 A | 1/1930 | Staehlin |
| 1,803,906 A | 5/1931 | Krieger et al. |
| 1,844,199 A | 2/1932 | Bicknell et al. |
| 1,876,880 A | 9/1932 | Drapal |
| 1,880,572 A | 10/1932 | Wendt et al. |
| 1,880,573 A | 10/1932 | Wendt et al. |
| 1,916,350 A | 7/1933 | Wendt et al. |
| 1,916,779 A | 7/1933 | Wendt et al. |
| 1,955,898 A | 4/1934 | Wendt et al. |
| 1,962,111 A | 6/1934 | Bamberger |
| 2,005,378 A | 6/1935 | Kiel |
| 2,005,511 A | 6/1935 | Stoll et al. |
| 2,049,005 A | 7/1936 | Gaspar |
| 2,054,390 A | 9/1936 | Rust et al. |
| 2,058,489 A | 10/1936 | Murch et al. |
| 2,062,304 A | 12/1936 | Gaspar |
| 2,090,511 A | 8/1937 | Crossley et al. |
| 2,097,119 A | 10/1937 | Eggert |
| 2,106,539 A | 1/1938 | Schnitzspahn |
| 2,111,692 A | 3/1938 | Saunders et al. |
| 2,125,015 A | 7/1938 | Gaspar |
| 2,130,572 A | 9/1938 | Wendt |
| 2,132,154 A | 10/1938 | Gaspar |
| 2,145,960 A | 2/1939 | Wheatley et al. |
| 2,154,996 A | 4/1939 | Rawling |
| 2,159,280 A | 5/1939 | Mannes et al. |
| 2,171,976 A | 9/1939 | Erickson |
| 2,181,800 A | 11/1939 | Crossley et al. |
| 2,185,153 A | 12/1939 | Lecher et al. |
| 2,220,178 A | 11/1940 | Schneider |
| 2,230,590 A | 2/1941 | Eggert et al. |
| 2,237,885 A | 4/1941 | Markush et al. |
| 2,243,630 A | 5/1941 | Houk et al. |
| 2,268,324 A | 12/1941 | Polgar |
| 2,281,895 A | 5/1942 | von Poser et al. |
| 2,328,166 A | 8/1943 | Poigar et al. |
| 2,346,090 A | 4/1944 | Staehle |
| 2,349,090 A | 5/1944 | Haddock |
| 2,356,618 A | 8/1944 | Rossander et al. |
| 2,361,301 A | 10/1944 | Libby, Jr. et al. |
| 2,364,359 A | 12/1944 | Kienle et al. |
| 2,381,145 A | 8/1945 | von Glahn et al. |
| 2,382,904 A | 8/1945 | Federsen |
| 2,386,646 A | 10/1945 | Adams et al. |
| 2,402,106 A | 6/1946 | von Glahn et al. |
| 2,416,145 A | 2/1947 | Biro |
| 2,477,165 A | 7/1949 | Bergstrom |
| 2,527,347 A | 10/1950 | Bergstrom |
| 2,580,461 A | 1/1952 | Pearl |
| 2,601,669 A | 6/1952 | Tullsen |
| 2,612,494 A | 9/1952 | von Glahn et al. |
| 2,612,495 A | 9/1952 | von Glahn et al. |
| 2,628,959 A | 2/1953 | von Glahn et al. |
| 2,647,080 A | 7/1953 | Joyce |
| 2,680,685 A | 6/1954 | Ratchford |
| 2,728,784 A | 12/1955 | Tholstrup et al. |
| 2,732,301 A | 1/1956 | Robertson et al. |
| 2,744,103 A | 5/1956 | Koch |
| 2,757,090 A | 7/1956 | Meugebauer et al. |
| 2,763,550 A | 9/1956 | Lovick |
| 2,768,171 A | 10/1956 | Clarke et al. |
| 2,773,056 A | 12/1956 | Helfaer |
| 2,798,000 A | 7/1957 | Monterman |

(List continued on next page.)

FOREIGN PATENT DOCUMENTS

| AU | 103085 | 4/1937 |
|---|---|---|
| AU | 12624/88 | 9/1988 |
| BE | 620075 | 5/1962 |
| BE | 637169 | 3/1964 |
| CA | 413257 | 10/1932 |

(List continued on next page.)

OTHER PUBLICATIONS

Noguchi, H. UV Curable, Aqueous Ink Jet Ink: Material Design and Performance for Digital Printing *1998 International Conf. on Digital Printing Technologies* 107–110 (No month avail.).

ESP@CENET databse JP 10324836 (Omron Corp.), Dec. 8, 1998. abstract (No month avail.).

(List continued on next page.)

*Primary Examiner*—Bernard Pianalto
(74) *Attorney, Agent, or Firm*—Kilpatrick Stockton LLP

(57) ABSTRACT

The present invention relates to colorant compositions containing neonanoplasts. The colorant compositions exhibit improved color brightness and brilliance due to the incorporation of one or more colorants in the neonanoplasts. The colorant compositions may be printed onto virtually any substrate. The colorant compositions of the present invention have particular utility in the area of printed textiles.

39 Claims, No Drawings

U.S. PATENT DOCUMENTS

| | | |
|---|---|---|
| 2,809,189 A | 10/1957 | Stanley et al. |
| 2,827,358 A | 3/1958 | Kaplan et al. |
| 2,834,773 A | 5/1958 | Scalera et al. |
| 2,875,045 A | 2/1959 | Lurie |
| 2,892,865 A | 6/1959 | Giraldi et al. |
| 2,897,187 A | 7/1959 | Koch |
| 2,936,241 A | 5/1960 | Sharp et al. |
| 2,940,853 A | 6/1960 | Sagura et al. |
| 2,955,067 A | 10/1960 | McBurney et al. |
| 2,992,129 A | 7/1961 | Gauthier |
| 2,992,198 A | 7/1961 | Funahashi |
| 3,030,208 A | 4/1962 | Schellenberg et al. |
| 3,071,815 A | 1/1963 | MacKinnon |
| 3,075,014 A | 1/1963 | Palopoli et al. |
| 3,076,813 A | 2/1963 | Sharp |
| 3,104,973 A | 9/1963 | Sprague et al. |
| 3,114,634 A | 12/1963 | Brown et al. |
| 3,121,632 A | 2/1964 | Sprague et al. |
| 3,123,647 A | 3/1964 | Duennenberger et al. |
| 3,133,049 A | 5/1964 | Hertel et al. |
| 3,140,949 A | 7/1964 | Sprague et al. |
| 3,154,416 A | 10/1964 | Fidelman |
| 3,155,509 A | 11/1964 | Roscow |
| 3,175,905 A | 3/1965 | Wiesbaden |
| 3,178,285 A | 4/1965 | Anderau et al. |
| 3,238,163 A | 3/1966 | O'Neill |
| 3,242,215 A | 3/1966 | Heitmiller |
| 3,248,337 A | 4/1966 | Zirker et al. |
| 3,266,973 A | 8/1966 | Crowley |
| 3,282,886 A | 11/1966 | Gadecki |
| 3,284,205 A | 11/1966 | Sprague et al. |
| 3,300,314 A | 1/1967 | Rauner et al. |
| 3,304,297 A | 2/1967 | Wegmann et al. |
| 3,305,361 A | 2/1967 | Gaynor et al. |
| 3,313,797 A | 4/1967 | Kissa |
| 3,320,080 A | 5/1967 | Mazzarella et al. |
| 3,330,659 A | 7/1967 | Wainer |
| 3,341,492 A | 9/1967 | Champ et al. |
| 3,359,109 A | 12/1967 | Harder et al. |
| 3,361,827 A | 1/1968 | Biletch |
| 3,363,969 A | 1/1968 | Brooks |
| 3,385,700 A | 5/1968 | Willems et al. |
| 3,397,984 A | 8/1968 | Williams et al. |
| 3,415,875 A | 12/1968 | Luethi et al. |
| 3,418,118 A | 12/1968 | Thommes et al. |
| 3,445,234 A | 5/1969 | Cescon et al. |
| 3,453,258 A | 7/1969 | Parmerter et al. |
| 3,453,259 A | 7/1969 | Parmerter et al. |
| 3,464,841 A | 9/1969 | Skofronick |
| 3,467,647 A | 9/1969 | Benninga |
| 3,479,185 A | 11/1969 | Chambers |
| 3,502,476 A | 3/1970 | Kohei et al. |
| 3,503,744 A | 3/1970 | Itano et al. |
| 3,514,597 A | 5/1970 | Haes et al. |
| 3,541,142 A | 11/1970 | Cragoe, Jr. |
| 3,546,161 A | 12/1970 | Wolheim |
| 3,547,646 A | 12/1970 | Hori et al. |
| 3,549,367 A | 12/1970 | Chang et al. |
| 3,553,710 A | 1/1971 | Lloyd et al. |
| 3,563,931 A | 2/1971 | Horiguchi |
| 3,565,753 A | 2/1971 | Yurkowitz |
| 3,574,624 A | 4/1971 | Reynolds et al. |
| 3,579,533 A | 5/1971 | Yalman |
| 3,595,655 A | 7/1971 | Robinson et al. |
| 3,595,657 A | 7/1971 | Robinson et al. |
| 3,595,658 A | 7/1971 | Gerlach et al. |
| 3,595,659 A | 7/1971 | Gerlach et al. |
| 3,607,639 A | 9/1971 | Krefeld et al. |
| 3,607,693 A | 9/1971 | Heine et al. |
| 3,607,863 A | 9/1971 | Dosch |
| 3,615,562 A | 10/1971 | Harrison et al. |
| 3,617,288 A | 11/1971 | Hartman et al. |
| 3,617,335 A | 11/1971 | Kumura et al. |
| 3,619,238 A | 11/1971 | Kimura et al. |
| 3,619,239 A | 11/1971 | Osada et al. |
| 3,637,337 A | 1/1972 | Pilling |
| 3,637,581 A | 1/1972 | Horioguchi et al. |
| 3,642,472 A | 2/1972 | Mayo |
| 3,647,467 A | 3/1972 | Grubb |
| 3,652,275 A | 3/1972 | Baum et al. |
| 3,660,542 A | 5/1972 | Adachi et al. |
| 3,667,954 A | 6/1972 | Itano et al. |
| 3,668,188 A | 6/1972 | King et al. |
| 3,669,925 A | 6/1972 | King et al. |
| 3,671,096 A | 6/1972 | Mackin |
| 3,671,251 A | 6/1972 | Houle et al. |
| 3,676,690 A | 7/1972 | McMillin et al. |
| 3,678,044 A | 7/1972 | Adams |
| 3,689,565 A | 9/1972 | Hoffmann et al. |
| 3,694,241 A | 9/1972 | Guthrie et al. |
| 3,695,879 A | 10/1972 | Laming et al. |
| 3,697,280 A | 10/1972 | Strilko |
| 3,705,043 A | 12/1972 | Zablak |
| 3,707,371 A | 12/1972 | Files |
| 3,729,313 A | 4/1973 | Smith |
| 3,737,628 A | 6/1973 | Azure |
| 3,765,896 A | 10/1973 | Fox |
| 3,775,130 A | 11/1973 | Enomoto et al. |
| 3,788,849 A | 1/1974 | Taguchi et al. |
| 3,799,773 A | 3/1974 | Watarai et al. |
| 3,800,439 A | 4/1974 | Sokolski et al. |
| 3,801,329 A | 4/1974 | Sandner et al. |
| 3,817,752 A | 6/1974 | Laridon et al. |
| 3,840,338 A | 10/1974 | Zviak et al. |
| 3,844,790 A | 10/1974 | Chang et al. |
| RE28,225 E | 11/1974 | Heseltine et al. |
| 3,870,524 A | 3/1975 | Watanabe et al. |
| 3,873,500 A | 3/1975 | Kato et al. |
| 3,876,496 A | 4/1975 | Lozano |
| 3,887,450 A | 6/1975 | Gilano et al. |
| 3,895,949 A | 7/1975 | Akamatsu |
| 3,901,779 A | 8/1975 | Mani |
| 3,910,993 A | 10/1975 | Avar et al. |
| 3,914,165 A | 10/1975 | Gaske |
| 3,914,166 A | 10/1975 | Rudolph et al. |
| 3,915,824 A | 10/1975 | McGinniss |
| 3,919,323 A | 11/1975 | Houlihan et al. |
| 3,926,641 A | 12/1975 | Rosen |
| 3,928,264 A | 12/1975 | Young, Jr. et al. |
| 3,929,988 A | 12/1975 | Barth |
| 3,933,682 A | 1/1976 | Bean |
| RE28,789 E | 4/1976 | Chang |
| 3,952,129 A | 4/1976 | Matsukawa et al. |
| 3,957,964 A | 5/1976 | Grimm |
| 3,960,685 A | 6/1976 | Sano et al. |
| 3,965,157 A | 6/1976 | Harrison |
| 3,978,132 A | 8/1976 | Houlihan et al. |
| 3,984,248 A | 10/1976 | Sturmer |
| 3,988,154 A | 10/1976 | Sturmer |
| 4,004,998 A | 1/1977 | Rosen |
| 4,012,256 A | 3/1977 | Levinos |
| 4,017,652 A | 4/1977 | Gruber |
| 4,022,674 A | 5/1977 | Rosen |
| 4,024,324 A | 5/1977 | Sparks |
| 4,039,332 A | 8/1977 | Kokelenberg et al. |
| 4,043,819 A | 8/1977 | Baumann |
| 4,048,034 A | 9/1977 | Martan |
| 4,054,719 A | 10/1977 | Cordes, III |
| 4,056,665 A | 11/1977 | Tayler et al. |
| 4,058,400 A | 11/1977 | Crivello |
| 4,067,892 A | 1/1978 | Thorne et al. |

| | | | | | |
|---|---|---|---|---|---|
| 4,071,424 A | 1/1978 | Dart et al. | 4,315,807 A | 2/1982 | Felder et al. |
| 4,071,614 A | 1/1978 | Grimm | 4,318,705 A | 3/1982 | Nowak et al. |
| 4,073,968 A | 2/1978 | Miyamoto et al. | 4,318,791 A | 3/1982 | Felder et al. |
| 4,077,769 A | 3/1978 | Garcia | 4,321,118 A | 3/1982 | Felder et al. |
| 4,079,183 A | 3/1978 | Green | 4,335,054 A | 6/1982 | Blaser et al. |
| 4,085,062 A | 4/1978 | Virgilio et al. | 4,335,055 A | 6/1982 | Blaser et al. |
| 4,090,877 A | 5/1978 | Streeper | 4,336,323 A | 6/1982 | Winslow |
| 4,100,047 A | 7/1978 | McCarty | 4,343,891 A | 8/1982 | Aasen et al. |
| 4,105,572 A | 8/1978 | Gorondy | 4,345,011 A | 8/1982 | Drexhage |
| 4,107,733 A | 8/1978 | Schickedanz | 4,347,111 A | 8/1982 | Gehlhaus et al. |
| 4,110,112 A | 8/1978 | Roman et al. | 4,349,617 A | 9/1982 | Kawashiri et al. |
| 4,111,699 A | 9/1978 | Krueger | 4,350,753 A | 9/1982 | Shelnut et al. |
| 4,114,028 A | 9/1978 | Baio et al. | 4,351,893 A | 9/1982 | Anderson |
| 4,126,412 A | 11/1978 | Masson et al. | 4,356,255 A | 10/1982 | Tachikawa et al. |
| 4,141,807 A | 2/1979 | Via | 4,357,468 A | 11/1982 | Szejtli et al. |
| 4,144,156 A | 3/1979 | Kuesters et al. | 4,359,524 A | 11/1982 | Masuda et al. |
| 4,148,658 A | 4/1979 | Kondoh et al. | 4,362,806 A | 12/1982 | Whitmore |
| 4,162,162 A | 7/1979 | Dueber | 4,367,072 A | 1/1983 | Vogtle et al. |
| 4,171,977 A | 10/1979 | Hasegawa et al. | 4,367,280 A | 1/1983 | Kondo et al. |
| 4,178,577 A | 12/1979 | Green | 4,369,283 A | 1/1983 | Altschuler |
| 4,181,807 A | 1/1980 | Green | 4,370,401 A | 1/1983 | Winslow et al. |
| 4,190,671 A | 2/1980 | Vanstone et al. | 4,372,582 A | 2/1983 | Geisler |
| 4,197,080 A | 4/1980 | Mee | 4,373,017 A | 2/1983 | Masukawa et al. |
| 4,199,420 A | 4/1980 | Photis | 4,373,020 A | 2/1983 | Winslow |
| 4,229,172 A | 10/1980 | Baumann et al. | 4,374,984 A | 2/1983 | Eichler et al. |
| 4,232,106 A | 11/1980 | Iwasaki et al. | 4,376,887 A | 3/1983 | Greenaway et al. |
| 4,238,492 A | 12/1980 | Majoie | 4,383,835 A | 5/1983 | Preuss et al. |
| 4,239,843 A | 12/1980 | Hara et al. | 4,390,616 A | 6/1983 | Sato et al. |
| 4,239,850 A | 12/1980 | Kita et al. | 4,391,867 A | 7/1983 | Derick et al. |
| 4,241,155 A | 12/1980 | Hara et al. | 4,399,209 A | 8/1983 | Sanders et al. |
| 4,242,430 A | 12/1980 | Hara et al. | 4,400,173 A | 8/1983 | Beavan |
| 4,242,431 A | 12/1980 | Hara et al. | 4,401,470 A | 8/1983 | Bridger |
| 4,245,018 A | 1/1981 | Hara et al. | 4,416,961 A | 11/1983 | Drexhage |
| 4,245,033 A | 1/1981 | Eida et al. | 4,421,559 A | 12/1983 | Owatari |
| 4,245,995 A | 1/1981 | Hugl et al. | 4,424,325 A | 1/1984 | Tsunoda et al. |
| 4,246,330 A | 1/1981 | Hara et al. | 4,425,162 A | 1/1984 | Sugiyama |
| 4,248,949 A | 2/1981 | Hara et al. | 4,425,424 A | 1/1984 | Altland et al. |
| 4,250,096 A | 2/1981 | Kvita et al. | 4,426,153 A | 1/1984 | Libby et al. |
| 4,251,622 A | 2/1981 | Kimoto et al. | 4,434,035 A | 2/1984 | Eichler et al. |
| 4,251,662 A | 2/1981 | Ozawa et al. | 4,440,827 A | 4/1984 | Miyamoto et al. |
| 4,254,195 A | 3/1981 | Hara et al. | 4,447,521 A | 5/1984 | Tiers et al. |
| 4,256,493 A | 3/1981 | Yokoyama et al. | 4,450,227 A | 5/1984 | Holmes et al. |
| 4,256,817 A | 3/1981 | Hara et al. | 4,460,676 A | 7/1984 | Fabel |
| 4,258,123 A | 3/1981 | Nagashima et al. | 4,467,112 A | 8/1984 | Matsuura et al. |
| 4,258,367 A | 3/1981 | Mansukhani | 4,475,999 A | 10/1984 | Via |
| 4,259,432 A | 3/1981 | Kondoh et al. | 4,477,681 A | 10/1984 | Gehlhaus et al. |
| 4,262,936 A | 4/1981 | Miyamoto | 4,489,334 A | 12/1984 | Owatari |
| 4,268,605 A | 5/1981 | Hara et al. | 4,495,041 A | 1/1985 | Goldstein |
| 4,268,667 A | 5/1981 | Anderson | 4,496,447 A | 1/1985 | Eichler et al. |
| 4,269,926 A | 5/1981 | Hara et al. | 4,500,355 A | 2/1985 | Shimada et al. |
| 4,270,130 A | 5/1981 | Houle et al. | 4,508,570 A | 4/1985 | Fugii et al. |
| 4,271,252 A | 6/1981 | Hara et al. | 4,510,392 A | 4/1985 | Litt et al. |
| 4,271,253 A | 6/1981 | Hara et al. | 4,523,924 A | 6/1985 | Lacroix |
| 4,272,244 A | 6/1981 | Schlick | 4,524,122 A | 6/1985 | Weber et al. |
| 4,276,211 A | 6/1981 | Singer et al. | 4,534,838 A | 8/1985 | Lin et al. |
| 4,277,497 A | 7/1981 | Fromantin | 4,548,896 A | 10/1985 | Sabongi et al. |
| 4,279,653 A | 7/1981 | Makishima et al. | 4,555,474 A | 11/1985 | Kawamura |
| 4,279,982 A | 7/1981 | Iwasaki et al. | 4,557,730 A | 12/1985 | Bennett et al. |
| 4,279,985 A | 7/1981 | Nonogaki et al. | 4,565,560 A | 1/1986 | Tani et al. |
| 4,284,485 A | 8/1981 | Berner | 4,565,769 A | 1/1986 | Dueber et al. |
| 4,288,631 A | 9/1981 | Ching | 4,567,171 A | 1/1986 | Mangum |
| 4,289,844 A | 9/1981 | Specht et al. | 4,571,377 A | 2/1986 | McGinniss et al. |
| 4,290,870 A | 9/1981 | Kondoh et al. | 4,595,745 A | 6/1986 | Nakano et al. |
| 4,293,458 A | 10/1981 | Gruenberger et al. | 4,604,344 A | 8/1986 | Irving et al. |
| 4,298,679 A | 11/1981 | Shinozaki et al. | 4,605,442 A | 8/1986 | Kawashita et al. |
| 4,300,123 A | 11/1981 | McMillin et al. | 4,613,334 A | 9/1986 | Thomas et al. |
| 4,301,223 A | 11/1981 | Nakamura et al. | 4,614,723 A | 9/1986 | Schmidt et al. |
| 4,302,606 A | 11/1981 | Barabas et al. | 4,617,380 A | 10/1986 | Hinson et al. |
| 4,306,014 A | 12/1981 | Kunikane et al. | 4,620,875 A | 11/1986 | Shimada et al. |
| 4,307,182 A | 12/1981 | Dalzell et al. | 4,620,876 A | 11/1986 | Fugii et al. |
| 4,308,400 A | 12/1981 | Felder et al. | 4,622,286 A | 11/1986 | Sheets |

| Patent No. | Date | Inventor |
|---|---|---|
| 4,631,085 A | 12/1986 | Kawanishi et al. |
| 4,632,891 A | 12/1986 | Banks et al. |
| 4,632,895 A | 12/1986 | Patel et al. |
| 4,634,644 A | 1/1987 | Irving et al. |
| 4,638,340 A | 1/1987 | Iiyama et al. |
| 4,647,310 A | 3/1987 | Shimada et al. |
| 4,655,783 A | 4/1987 | Reinert et al. |
| 4,663,275 A | 5/1987 | West et al. |
| 4,663,641 A | 5/1987 | Iiyama et al. |
| 4,668,533 A | 5/1987 | Miller |
| 4,672,041 A | 6/1987 | Jain |
| 4,698,291 A | 10/1987 | Koibuchi et al. |
| 4,701,402 A | 10/1987 | Patel et al. |
| 4,702,996 A | 10/1987 | Griffing et al. |
| 4,704,133 A | 11/1987 | Reinert et al. |
| 4,707,161 A | 11/1987 | Thomas et al. |
| 4,707,425 A | 11/1987 | Sasagawa et al. |
| 4,707,430 A | 11/1987 | Ozawa et al. |
| 4,711,668 A | 12/1987 | Shimada et al. |
| 4,711,802 A | 12/1987 | Tannenbaum |
| 4,713,113 A | 12/1987 | Shimada et al. |
| 4,720,450 A | 1/1988 | Ellis |
| 4,721,531 A | 1/1988 | Wildeman et al. |
| 4,721,734 A | 1/1988 | Gehlhaus et al. |
| 4,724,021 A | 2/1988 | Martin et al. |
| 4,724,201 A | 2/1988 | Okazaki et al. |
| 4,725,527 A | 2/1988 | Robillard |
| 4,727,824 A | 3/1988 | Durcharme et al. |
| 4,732,615 A | 3/1988 | Kawashita et al. |
| 4,737,190 A | 4/1988 | Shimada et al. |
| 4,737,438 A | 4/1988 | Ito et al. |
| 4,740,451 A | 4/1988 | Kohara |
| 4,745,042 A | 5/1988 | Sasago et al. |
| 4,746,735 A | 5/1988 | Kruper, Jr. et al. |
| 4,752,341 A | 6/1988 | Rock |
| 4,755,450 A | 7/1988 | Sanders et al. |
| 4,761,181 A | 8/1988 | Suzuki et al. |
| 4,766,050 A | 8/1988 | Jerry |
| 4,766,055 A | 8/1988 | Kawabata et al. |
| 4,770,667 A | 9/1988 | Evans et al. |
| 4,772,291 A | 9/1988 | Shibanai et al. |
| 4,772,541 A | 9/1988 | Gottschalk |
| 4,775,386 A | 10/1988 | Reinert et al. |
| 4,786,586 A | 11/1988 | Lee et al. |
| 4,789,382 A | 12/1988 | Neumann et al. |
| 4,790,565 A | 12/1988 | Steed |
| 4,800,149 A | 1/1989 | Gottschalk |
| 4,803,008 A | 2/1989 | Ciolino et al. |
| 4,808,189 A | 2/1989 | Oishi et al. |
| 4,812,139 A | 3/1989 | Brodmann |
| 4,812,517 A | 3/1989 | West |
| 4,813,970 A | 3/1989 | Kirjanov et al. |
| 4,822,714 A | 4/1989 | Sanders |
| 4,831,068 A | 5/1989 | Reinert et al. |
| 4,834,771 A | 5/1989 | Yamauchi et al. |
| 4,837,106 A | 6/1989 | Ishikawa et al. |
| 4,837,331 A | 6/1989 | Yamanishi et al. |
| 4,838,938 A | 6/1989 | Tomida et al. |
| 4,839,269 A | 6/1989 | Okazaki et al. |
| 4,849,320 A | 7/1989 | Irving et al. |
| 4,853,037 A | 8/1989 | Johnson et al. |
| 4,853,398 A | 8/1989 | Carr et al. |
| 4,854,971 A | 8/1989 | Gane et al. |
| 4,857,438 A | 8/1989 | Loerzer et al. |
| 4,861,916 A | 8/1989 | Kohler et al. |
| 4,865,942 A | 9/1989 | Gottschalk et al. |
| 4,874,391 A | 10/1989 | Reinert |
| 4,874,899 A | 10/1989 | Hoelderich et al. |
| 4,885,395 A | 12/1989 | Hoelderich |
| 4,886,774 A | 12/1989 | Doi |
| 4,892,941 A | 1/1990 | Dolphin et al. |
| 4,895,880 A | 1/1990 | Gottschalk |
| 4,900,581 A | 2/1990 | Stuke et al. |
| 4,902,299 A | 2/1990 | Anton |
| 4,902,725 A | 2/1990 | Moore |
| 4,902,787 A | 2/1990 | Freeman |
| 4,911,732 A | 3/1990 | Neumann et al. |
| 4,911,899 A | 3/1990 | Hagiwara et al. |
| 4,917,956 A | 4/1990 | Rohrbach |
| 4,921,317 A | 5/1990 | Suzuki et al. |
| 4,925,770 A | 5/1990 | Ichiura et al. |
| 4,925,777 A | 5/1990 | Inoue et al. |
| 4,926,190 A | 5/1990 | Lavar |
| 4,933,265 A | 6/1990 | Inoue et al. |
| 4,933,948 A | 6/1990 | Herkstoeter |
| 4,937,161 A | 6/1990 | Kita et al. |
| 4,942,113 A | 7/1990 | Trundle |
| 4,944,988 A | 7/1990 | Yasuda et al. |
| 4,950,304 A | 8/1990 | Reinert et al. |
| 4,952,478 A | 8/1990 | Miyagawa et al. |
| 4,952,680 A | 8/1990 | Schmeidl |
| 4,954,380 A | 9/1990 | Kanome et al. |
| 4,954,416 A | 9/1990 | Wright et al. |
| 4,956,254 A | 9/1990 | Washizu et al. |
| 4,964,871 A | 10/1990 | Reinert et al. |
| 4,965,294 A | 10/1990 | Ohngemach et al. |
| 4,966,607 A | 10/1990 | Shinoki et al. |
| 4,966,833 A | 10/1990 | Inoue |
| 4,968,596 A | 11/1990 | Inoue et al. |
| 4,968,813 A | 11/1990 | Rule et al. |
| 4,985,345 A | 1/1991 | Hayakawa et al. |
| 4,987,056 A | 1/1991 | Imahashi et al. |
| 4,988,561 A | 1/1991 | Wason |
| 4,997,745 A | 3/1991 | Kawamura et al. |
| 5,001,330 A | 3/1991 | Koch |
| 5,002,853 A | 3/1991 | Aoai et al. |
| 5,002,993 A | 3/1991 | West et al. |
| 5,003,142 A | 3/1991 | Fuller |
| 5,006,758 A | 4/1991 | Gellert et al. |
| 5,013,959 A | 5/1991 | Kogelschatz |
| 5,017,195 A | 5/1991 | Satou et al. |
| 5,023,129 A | 6/1991 | Morganti et al. |
| 5,025,036 A | 6/1991 | Carson et al. |
| 5,026,425 A | 6/1991 | Hindagolla et al. |
| 5,026,427 A | 6/1991 | Mitchell et al. |
| 5,028,262 A | 7/1991 | Barlow, Jr. et al. |
| 5,028,792 A | 7/1991 | Mullis |
| 5,030,243 A | 7/1991 | Reinert |
| 5,030,248 A | 7/1991 | Meszaros |
| 5,034,526 A | 7/1991 | Bonham et al. |
| 5,037,726 A | 8/1991 | Kojima et al. |
| 5,045,435 A | 9/1991 | Adams et al. |
| 5,045,573 A | 9/1991 | Kohler et al. |
| 5,047,556 A | 9/1991 | Kohler et al. |
| 5,049,777 A | 9/1991 | Mechtersheimer |
| 5,053,320 A | 10/1991 | Robbilard |
| 5,055,579 A | 10/1991 | Pawlowski et al. |
| 5,057,562 A | 10/1991 | Reinert |
| 5,068,140 A | 11/1991 | Malhotra et al. |
| 5,068,364 A | 11/1991 | Takagaki et al. |
| 5,069,681 A | 12/1991 | Bouwknegt et al. |
| 5,070,001 A | 12/1991 | Stahlhofen |
| 5,073,448 A | 12/1991 | Vieira et al. |
| 5,074,885 A | 12/1991 | Reinert |
| 5,076,808 A | 12/1991 | Hahn et al. |
| 5,085,698 A | 2/1992 | Ma et al. |
| 5,087,550 A | 2/1992 | Blum et al. |
| 5,089,050 A | 2/1992 | Vieira et al. |
| 5,089,374 A | 2/1992 | Saeva |
| 5,096,456 A | 3/1992 | Reinert et al. |
| 5,096,489 A | 3/1992 | Laver |
| 5,096,781 A | 3/1992 | Vieira et al. |

| | | |
|---|---|---|
| 5,098,477 A | 3/1992 | Vieira et al. |
| 5,098,793 A | 3/1992 | Rohrbach et al. |
| 5,098,806 A | 3/1992 | Robillard |
| 5,106,723 A | 4/1992 | West et al. |
| 5,108,505 A | 4/1992 | Moffat |
| 5,108,874 A | 4/1992 | Griffing et al. |
| 5,110,706 A | 5/1992 | Yumoto et al. |
| 5,110,709 A | 5/1992 | Aoai et al. |
| 5,114,832 A | 5/1992 | Zertani et al. |
| 5,124,723 A | 6/1992 | Laver |
| 5,130,227 A | 7/1992 | Wade et al. |
| 5,133,803 A | 7/1992 | Moffatt |
| 5,135,940 A | 8/1992 | Belander et al. |
| 5,139,572 A | 8/1992 | Kawashima |
| 5,139,687 A | 8/1992 | Borgher, Sr. et al. |
| 5,141,556 A | 8/1992 | Matrick |
| 5,141,797 A | 8/1992 | Wheeler |
| 5,144,964 A | 9/1992 | Demian |
| 5,147,901 A | 9/1992 | Rutsch et al. |
| 5,153,104 A | 10/1992 | Rossman et al. |
| 5,153,105 A | 10/1992 | Sher et al. |
| 5,153,166 A | 10/1992 | Jain et al. |
| 5,160,346 A | 11/1992 | Fuso et al. |
| 5,160,372 A | 11/1992 | Matrick |
| 5,166,041 A | 11/1992 | Murofushi et al. |
| 5,169,436 A | 12/1992 | Matrick |
| 5,169,438 A | 12/1992 | Matrick |
| 5,173,112 A | 12/1992 | Matrick et al. |
| 5,176,984 A | 1/1993 | Hipps, Sr. et al. |
| 5,178,420 A | 1/1993 | Shelby |
| 5,180,425 A | 1/1993 | Matrick et al. |
| 5,180,624 A | 1/1993 | Kojima et al. |
| 5,180,652 A | 1/1993 | Yamaguchi et al. |
| 5,181,935 A | 1/1993 | Reinert et al. |
| 5,185,236 A | 2/1993 | Shiba et al. |
| 5,187,045 A | 2/1993 | Bonham et al. |
| 5,187,049 A | 2/1993 | Sher et al. |
| 5,190,565 A | 3/1993 | Berenbaum et al. |
| 5,190,710 A | 3/1993 | Kletecka |
| 5,190,845 A | 3/1993 | Hashimoto et al. |
| 5,193,854 A | 3/1993 | Borowski, Jr. et al. |
| 5,196,295 A | 3/1993 | Davis |
| 5,197,991 A | 3/1993 | Rembold |
| 5,198,330 A | 3/1993 | Martic et al. |
| 5,202,209 A | 4/1993 | Winnik et al. |
| 5,202,210 A | 4/1993 | Matsuoka et al. |
| 5,202,211 A | 4/1993 | Vercoulen |
| 5,202,212 A | 4/1993 | Shin et al. |
| 5,202,213 A | 4/1993 | Nakahara et al. |
| 5,202,215 A | 4/1993 | Kanakura et al. |
| 5,202,221 A | 4/1993 | Imai et al. |
| 5,205,861 A | 4/1993 | Matrick |
| 5,208,136 A | 5/1993 | Zanoni et al. |
| 5,209,814 A | 5/1993 | Felten et al. |
| 5,219,703 A | 6/1993 | Bugner et al. |
| 5,221,334 A | 6/1993 | Ma et al. |
| 5,224,197 A | 6/1993 | Zanoni et al. |
| 5,224,476 A | 7/1993 | Schultz et al. |
| 5,224,987 A | 7/1993 | Matrick |
| 5,226,957 A | 7/1993 | Wickramanayake et al. |
| 5,227,022 A | 7/1993 | Leonhardt et al. |
| 5,230,982 A | 7/1993 | Davis et al. |
| 5,241,059 A | 8/1993 | Yoshinaga |
| 5,244,476 A | 9/1993 | Schulz et al. |
| 5,250,109 A | 10/1993 | Chan et al. |
| 5,254,429 A | 10/1993 | Gracia et al. |
| 5,256,193 A | 10/1993 | Winnik et al. |
| 5,258,274 A | 11/1993 | Helland et al. |
| 5,261,953 A | 11/1993 | Vieira et al. |
| 5,262,276 A | 11/1993 | Kawamura |
| 5,268,027 A | 12/1993 | Chan et al. |
| 5,270,078 A | 12/1993 | Walker et al. |
| 5,271,764 A | 12/1993 | Winnik et al. |
| 5,271,765 A | 12/1993 | Ma |
| 5,272,201 A | 12/1993 | Ma et al. |
| 5,275,646 A | 1/1994 | Marshall et al. |
| 5,279,652 A | 1/1994 | Kaufmann et al. |
| 5,282,894 A | 2/1994 | Albert et al. |
| 5,284,734 A | 2/1994 | Blum et al. |
| 5,286,286 A | 2/1994 | Winnik et al. |
| 5,286,288 A | 2/1994 | Tobias et al. |
| 5,294,528 A | 3/1994 | Furutachi |
| 5,296,275 A | 3/1994 | Goman et al. |
| 5,296,556 A | 3/1994 | Frihart |
| 5,298,030 A | 3/1994 | Burdeska et al. |
| 5,300,403 A | 4/1994 | Angelopulus et al. |
| 5,300,654 A | 4/1994 | Nakajima et al. |
| 5,302,195 A | 4/1994 | Helbrecht |
| 5,302,197 A | 4/1994 | Wickramanayke et al. |
| 5,310,778 A | 5/1994 | Shor et al. |
| 5,312,713 A | 5/1994 | Yokoyama et al. |
| 5,312,721 A | 5/1994 | Gesign |
| 5,324,349 A | 6/1994 | Sano et al. |
| 5,328,504 A | 7/1994 | Ohnishi |
| 5,330,860 A | 7/1994 | Grot et al. |
| 5,334,455 A | 8/1994 | Noren et al. |
| 5,338,319 A | 8/1994 | Kaschig et al. |
| 5,340,631 A | 8/1994 | Matsuzawa et al. |
| 5,340,854 A | 8/1994 | Martic et al. |
| 5,344,483 A | 9/1994 | Hinton |
| 5,356,464 A | 10/1994 | Hickman et al. |
| 5,362,592 A | 11/1994 | Murofushi et al. |
| 5,368,689 A | 11/1994 | Agnemo |
| 5,372,387 A | 12/1994 | Wajda |
| 5,372,917 A | 12/1994 | Tsuchida et al. |
| 5,374,335 A | 12/1994 | Lindgren et al. |
| 5,376,503 A | 12/1994 | Audett et al. |
| 5,383,961 A | 1/1995 | Bauer et al. |
| 5,384,186 A | 1/1995 | Trinh |
| 5,393,580 A | 2/1995 | Ma et al. |
| 5,401,303 A | 3/1995 | Stoffel et al. |
| 5,401,562 A | 3/1995 | Akao |
| 5,415,686 A | 5/1995 | Kurabayashi et al. |
| 5,415,976 A | 5/1995 | Ali |
| 5,424,407 A | 6/1995 | Tanaka et al. |
| 5,425,978 A | 6/1995 | Berneth et al. |
| 5,426,164 A | 6/1995 | Babb et al. |
| 5,427,415 A | 6/1995 | Chang |
| 5,429,628 A | 7/1995 | Trinh et al. |
| 5,431,720 A | 7/1995 | Nagai et al. |
| 5,432,274 A | 7/1995 | Luong et al. |
| 5,445,651 A | 8/1995 | Thoen et al. |
| 5,445,842 A | 8/1995 | Tanaka et al. |
| 5,455,074 A | 10/1995 | Nohr et al. |
| 5,455,143 A | 10/1995 | Ali |
| 5,459,014 A | 10/1995 | Nishijima et al. |
| 5,464,472 A | 11/1995 | Horn et al. |
| 5,466,283 A | 11/1995 | Kondo et al. |
| 5,474,691 A | 12/1995 | Severns |
| 5,475,080 A | 12/1995 | Gruber et al. |
| 5,476,540 A | 12/1995 | Shields et al. |
| 5,479,949 A | 1/1996 | Battard et al. |
| 5,489,503 A | 2/1996 | Toan |
| 5,498,345 A | 3/1996 | Jollenbeck et al. |
| 5,501,774 A | 3/1996 | Burke |
| 5,501,902 A | 3/1996 | Kronzer |
| 5,503,664 A | 4/1996 | Sano et al. |
| 5,509,957 A | 4/1996 | Toan et al. |
| 5,531,821 A | 7/1996 | Wu |
| 5,532,112 A | 7/1996 | Kohler et al. |
| 5,541,633 A | 7/1996 | Winnik et al. |
| 5,543,459 A | 8/1996 | Hartmann et al. |

| | | | | | | |
|---|---|---|---|---|---|---|
| 5,569,529 | A | 10/1996 | Becker et al. | DE | 2202497 | 8/1972 |
| 5,571,313 | A | 11/1996 | Mafune et al. | DE | 2432563 | 2/1975 |
| 5,575,891 | A | 11/1996 | Trokhan et al. | DE | 2437380 | 2/1975 |
| 5,580,369 | A | 12/1996 | Belding et al. | DE | 2444520 | 3/1975 |
| 5,585,051 | A | 12/1996 | Hosie et al. | DE | 2416259 | 10/1975 |
| 5,591,489 | A | 1/1997 | Dragner et al. | DE | 2714978 | 10/1977 |
| 5,597,405 | A | 1/1997 | Grigoryan et al. | DE | 2722264 | 11/1978 |
| 5,607,803 | A | 3/1997 | Murofushi et al. | DE | 158237 | 1/1983 |
| 5,616,443 | A | 4/1997 | Nohr et al. | DE | 3126433 | 1/1983 |
| 5,635,297 | A | 6/1997 | Ogawa et al. | DE | 3415033 | 10/1984 |
| 5,643,356 | A | 7/1997 | Nohr et al. | DE | 271512 | 9/1989 |
| 5,643,631 | A | 7/1997 | Donigian et al. | DE | 3921600 | 1/1990 |
| 5,643,701 | A | 7/1997 | Nohr et al. | DE | 3833437 | 4/1990 |
| 5,645,964 | A | 7/1997 | Nohr et al. | DE | 3833438 | 4/1990 |
| 5,672,392 | A | 9/1997 | De Clercq et al. | DE | 004036328 | 7/1991 |
| 5,683,843 | A | 11/1997 | Nohr et al. | DE | 4132288 | 4/1992 |
| 5,685,754 | A | 11/1997 | Nohr et al. | DE | 4126461 | 2/1993 |
| 5,686,503 | A | 11/1997 | Nohr et al. | EP | 0003884 | 9/1979 |
| 5,700,582 | A | 12/1997 | Sargeant et al. | EP | 0029284 | 5/1981 |
| 5,700,850 | A | 12/1997 | Nohr et al. | EP | 0127574 | 12/1984 |
| 5,705,247 | A | 1/1998 | Arai et al. | EP | 0 209 831 | 1/1987 |
| 5,709,955 | A | 1/1998 | Nohr et al. | EP | 0223587 | 5/1987 |
| 5,709,976 | A | 1/1998 | Malhotra | EP | 0262533 | 4/1988 |
| 5,721,287 | A | 2/1998 | Nohr et al. | EP | 0280458 | 8/1988 |
| 5,733,693 | A | 3/1998 | Nohr et al. | EP | 0308274 | 3/1989 |
| 5,738,932 | A | 4/1998 | Kondo et al. | EP | 0351615 | 1/1990 |
| 5,739,175 | A | 4/1998 | Nohr et al. | EP | 0371304 | 6/1990 |
| 5,747,550 | A | 5/1998 | Nohr et al. | EP | 0373662 | 6/1990 |
| 5,773,182 | A | 6/1998 | Nohr et al. | EP | 0375160 | 6/1990 |
| 5,782,963 | A | 7/1998 | Nohr et al. | EP | 0390439 | 10/1990 |
| 5,786,132 | A | 7/1998 | Nohr et al. | EP | 0458140 A1 | 10/1991 |
| 5,798,015 | A | 8/1998 | Nohr et al. | EP | 0458140 | 11/1991 |
| 5,811,199 | A | 9/1998 | MacDonald et al. | EP | 0468465 | 1/1992 |
| 5,837,429 | A | 11/1998 | Nohr et al. | EP | 0 469 595 | 2/1992 |
| 5,849,411 | A | 12/1998 | Nohr et al. | EP | 0542286 | 5/1993 |
| 5,855,655 | A | 1/1999 | Nohr et al. | EP | 000571190 | 11/1993 |
| 5,865,471 | A | 2/1999 | Nohr et al. | EP | 0 605 840 | 7/1994 |
| 5,883,161 | A | 3/1999 | Wood et al. | EP | 0608433 | 8/1994 |
| 5,885,337 | A | 3/1999 | Nohr et al. | EP | 0609159 | 8/1994 |
| 5,891,229 | A | 4/1999 | Nohr et al. | EP | 0639664 | 2/1995 |
| 5,911,855 | A | 6/1999 | Dransmann et al. | EP | 0 673 779 | 9/1995 |
| | | | | EP | 0 716 929 | 6/1996 |
| | | FOREIGN PATENT DOCUMENTS | | EP | 0 737 592 | 10/1996 |
| CA | | 458808 | 12/1936 | EP | 0755984 | 1/1997 |
| CA | | 460268 | 11/1949 | EP | 0 805 152 | 11/1997 |
| CA | | 461082 | 11/1949 | FR | 2245010 | 4/1975 |
| CA | | 463021 | 2/1950 | FR | 2383157 | 10/1978 |
| CA | | 463022 | 2/1950 | GB | 275245 | 10/1928 |
| CA | | 465495 | 5/1950 | GB | 349339 | 5/1931 |
| CA | | 465496 | 5/1950 | GB | 355686 | 8/1931 |
| CA | | 465499 | 5/1950 | GB | 399753 | 10/1933 |
| CA | | 483214 | 5/1952 | GB | 441085 | 1/1936 |
| CA | | 517364 | 10/1955 | GB | 463515 | 4/1937 |
| CA | | 537687 | 3/1957 | GB | 492711 | 9/1938 |
| CA | | 552565 | 2/1958 | GB | 518612 | 3/1940 |
| CA | | 571792 | 3/1959 | GB | 539912 | 9/1941 |
| CA | | 779239 | 2/1968 | GB | 626727 | 7/1947 |
| CA | | 930103 | 7/1973 | GB | 600451 | 4/1948 |
| CA | | 2053094 | 4/1992 | GB | 616362 | 1/1949 |
| CH | | 603767 | 8/1978 | GB | 618616 | 2/1949 |
| CH | | 197808 | 5/1988 | GB | 779389 | 7/1957 |
| CZ | | 94118 | 5/1958 | GB | 1150987 | 5/1969 |
| DE | | 1047787 | 12/1957 | GB | 1372884 | 11/1974 |
| DE | | 1022801 | 1/1958 | GB | 2146357 | 4/1985 |
| DE | | 1039835 | 9/1958 | IT | 662500 | 4/1964 |
| DE | | 1040562 | 10/1958 | JP | 4315663 | 7/1968 |
| DE | | 1045414 | 12/1958 | JP | 4726653 | 7/1972 |
| DE | | 1047013 | 12/1958 | JP | 4745409 | 11/1972 |
| DE | | 1132540 | 7/1962 | JP | 49-8909 | 2/1974 |
| DE | | 1154069 | 9/1963 | JP | 5065592 | 6/1975 |
| DE | | 1240811 | 5/1967 | JP | 51-17802 | 2/1976 |

| | | |
|---|---|---|
| JP | 53-104321 | 9/1978 |
| JP | 55-62059 | 5/1980 |
| JP | 55-90506 | 7/1980 |
| JP | 56-8134 | 1/1981 |
| JP | 0014233 | 2/1981 |
| JP | 5614569 | 2/1981 |
| JP | 56-24472 | 3/1981 |
| JP | 56-36556 | 4/1981 |
| JP | 5761055 | 4/1982 |
| JP | 57128283 | 8/1982 |
| JP | 57171775 | 10/1982 |
| JP | 58-124452 | 7/1983 |
| JP | 58-125770 | 7/1983 |
| JP | 58-222164 | 12/1983 |
| JP | 5989360 | 5/1984 |
| JP | 29219270 | 12/1984 |
| JP | 59-219270 | 4/1985 |
| JP | 60-192729 | 10/1985 |
| JP | 60239739 | 11/1985 |
| JP | 60239740 | 11/1985 |
| JP | 60239741 | 11/1985 |
| JP | 60239743 | 11/1985 |
| JP | 61-288 | 1/1986 |
| JP | 613781 | 1/1986 |
| JP | 61-14994 | 1/1986 |
| JP | 61-14995 | 1/1986 |
| JP | 61-21184 | 1/1986 |
| JP | 61-25885 | 2/1986 |
| JP | 61-30592 | 2/1986 |
| JP | 61-40366 | 2/1986 |
| JP | 61-77846 | 4/1986 |
| JP | 61-128973 | 6/1986 |
| JP | 61-97025 | 9/1986 |
| JP | 61-222789 | 10/1986 |
| JP | 61-247703 | 11/1986 |
| JP | 61-285403 | 12/1986 |
| JP | 627703 | 1/1987 |
| JP | 62-97881 | 5/1987 |
| JP | 62-100557 | 5/1987 |
| JP | 62127281 | 6/1987 |
| JP | 424756 | 1/1988 |
| JP | 63-43959 | 2/1988 |
| JP | 63-48370 | 3/1988 |
| JP | 6395439 | 4/1988 |
| JP | 6395440 | 4/1988 |
| JP | 6395445 | 4/1988 |
| JP | 6395446 | 4/1988 |
| JP | 6395447 | 4/1988 |
| JP | 6395448 | 4/1988 |
| JP | 6395449 | 4/1988 |
| JP | 6395450 | 4/1988 |
| JP | 63151946 | 6/1988 |
| JP | 63-164953 | 7/1988 |
| JP | 63-165498 | 7/1988 |
| JP | 63-223077 | 9/1988 |
| JP | 63-223078 | 9/1988 |
| JP | 63-243101 | 10/1988 |
| JP | 63-199781 | 12/1988 |
| JP | 64-15049 | 1/1989 |
| JP | 6429337 | 1/1989 |
| JP | 64-40948 | 2/1989 |
| JP | 89014948 | 3/1989 |
| JP | 1-128063 | 5/1989 |
| JP | 1146974 | 6/1989 |
| JP | 01210477 | 8/1989 |
| JP | 1288854 | 11/1989 |
| JP | 2-58573 | 2/1990 |
| JP | 292957 | 4/1990 |
| JP | 2179642 | 7/1990 |
| JP | 2282261 | 11/1990 |
| JP | 3-134072 | 6/1991 |
| JP | 03163566 | 7/1991 |
| JP | 3-170415 | 7/1991 |
| JP | 3-206439 | 9/1991 |
| JP | 3-258867 | 11/1991 |
| JP | 3-203694 | 12/1991 |
| JP | 3284668 | 12/1991 |
| JP | 4023884 | 1/1992 |
| JP | 4023885 | 1/1992 |
| JP | 4-45174 | 2/1992 |
| JP | 4100801 | 4/1992 |
| JP | 4-136075 | 5/1992 |
| JP | 04356087 | 12/1992 |
| JP | 543806 | 2/1993 |
| JP | 561220 | 3/1993 |
| JP | 5080506 | 4/1993 |
| JP | 05119506 | 5/1993 |
| JP | 5134447 | 5/1993 |
| JP | 5-140498 | 6/1993 |
| JP | 2-219869 | 9/1993 |
| JP | 5263067 | 10/1993 |
| JP | 680915 | 3/1994 |
| JP | 6116555 | 4/1994 |
| JP | 6116556 | 4/1994 |
| JP | 6116557 | 4/1994 |
| JP | 6-175584 | 6/1994 |
| JP | 6214339 | 8/1994 |
| JP | 6256494 | 9/1994 |
| JP | 6256633 | 9/1994 |
| NL | 7113828 | 4/1972 |
| RU | 1310767 | 5/1987 |
| SU | 1772118 | 10/1992 |
| WO | 92/11295 | 7/1992 |
| WO | 93/06597 | 4/1993 |
| WO | 94/01503 | 1/1994 |
| WO | 94/22500 | 10/1994 |
| WO | 94/22501 | 10/1994 |
| WO | 95/04955 | 2/1995 |
| WO | 95/28285 | 10/1995 |
| WO | 96/00740 | 1/1996 |
| WO | 96/19502 | 6/1996 |
| WO | 96/22335 | 7/1996 |
| WO | 96/24636 | 8/1996 |

OTHER PUBLICATIONS

Derwent World Patents Index JP 8002092 (Mitsubishi Paper Mills Ltd.) Jan. 9, 1996. abstract (No month avail.).

Kubat et al. "Photophysical properties of metal complexes of meso–tetrakis (40sulphonatophenyl) porphyrin," *J. Photochem. and Photobiol.* 96 93–97 1996 (No month avail.).

Derwent World Patents Index EP 659039 (Canon KK) Jun. 21, 1995. abstract.

Derwent World Patents Index JP 7061114 (Dainippon Printing Co. Ltd.) Mar. 7, 1995. abstract (No month avail).

Abstract for WO 95/00343—A1 *Textiles: Paper: Cellulose* p. 7 1995 (No month avail.).

Maki, Y. et al. "A novel heterocyclic N–oxide, pyrimidol[5,4–g]pteridinetetrone 5–oxide, with multifunctional photooxidative properties" *Chemical Abstracts* 122 925 [no 122:31350 F] 1995 (No month avail.).

Abstract of patent, JP 6–80915 (Canon Inc.), Mar. 22, 1994. (No month avail.).

Abstract of patent, JP 06–43573 (Iku Meji) (Feb. 18, 1994) (No month avail.).

Pitchumani, K. et al. "Modification of chemical reactivity upon cyclodextrin encapsulation" *Chemical Abstracts* 121 982 [No. 121:13362 4v] 1994 (No month avail).

Wijesekera, T.P., et al. Synthetic Aspects of Pophyrin and Metalloporphyrin Chemistry *Metalloporpyrins in Catalytic Oxidations* pp. 202–203, 206–207, 1994 (No month avail).
Derwent Publications Ltd., London, JP 05297627 (Fujitsu Ltd.), Nov. 12, 1993. (Abstract) (No month).
Patent Abstracts of Japan, JP 5241369 (Bando Chem Ind Ltd et al.), Sep. 21, 1993. (Abstract) (No month).
Derwent Publications Ltd., London, JP 05232738 (Yamazaki, T.), Sep. 10, 1993. (Abstract) (No month).
Derwent Publications Ltd., London, EP 000559310 (Zeneca Ltd.), Sep. 8, 1993. (Abstract) (No month).
Derwent Publications Ltd., London, J,A, 5–230410 (Seiko Epson Corp), Sep. 7, 1993. (Abstract) (No month).
Derwent Publications Ltd., London, JP 5–230407 (Mitsubishi Kasei Corp), Sep. 7, 1993. (Abstract) (No month).
Abstract Of Patent, JP 405230410 ( Seiko Epson Corp.), Sep. 7, 1993. (Abstract) (No month).
Abstract Of Patent, JP 405230407 ( Mitsubishi Kasei Corp.), Sep. 7, 1993. (Abstract) (No month).
Patent Abstracts of Japan, JP 5197198 (Bando Chem Ind Ltd et al.), Aug. 6, 1993. (Abstract) (No month).
Database WPI –Derwent Publications Ltd., London, J,A, 5197069 (Bando Chem), Aug. 6, 1993. (Abstract) (No month).
Abstract of patent, JP 5–195450 (Nitto Boseki Co. Ltd), Aug. 3, 1993. No month).
Derwent World Patents Index JP 5186725 (Seiko Epson Corp.), Jul. 27, 1993. abstract (No month).
Derwent World Patents Index JP 5186725 (Seiko Epson Corp.), Jul. 27, 1993. abstract (No month).
Patent Abstracts of Japan, JP 5181308 (Bando Chem Ind Ltd et al.), Jul. 23, 1993. (Abstract) (No month).
Patent Abstracts of Japan, JP 5181310 (Bando Chem Ind Ltd et al.), Jul. 23, 1993. (Abstract) (No month).
Derwent Publications Ltd., London, JP 5–132638 (Mitsubishi Kasei Corp), May 28, 1993. (Abstract) (No month).
Abstract Of Patent, JP 405132638 ( Mitsubishi Kasei Corp.), May 28, 1993. (Abstract) (No month).
Derwent Publications Ltd., London, JP 5–125318 (Mitsubishi Kasei Corp), May 21, 1993. (Abstract) (No month).
Abstract Of Patent, JP 405125318 ( Mitsubishi Kasei Corp.), May 21, 1993. (Abstract) No month).
Abstract of patent, JP 05–117200 (Hidefumi Hirai et al.) (May 14, 1993) No month.
Derwent World Patents Index, JP 5117105 (Mitsui Toatsu Chem Inc.) May 14, 1993. No month.
Derwent Publications Ltd., London, JP 05061246 (Ricoh KK), Mar. 12, 1992. (Abstract) No month.
Husain, N. et al. "Cyclodextrins as mobile–phase additives in reversed–phase HPLC" *American Laboratory* 82 80–87 1993 No month.
Hamilton, D.P. "Tired of Shredding? New Ricoh Method Tries Different Tack" *Wall Street Journal* B2 1993 No month.
"Cyclodextrins: A Breakthrough for Molecular Encapsulation" *American Maize Products Co. (AMAIZO)* 1993 No month.
Duxbury "The Photochemistry and Photophysics of Triphenylmethane Dyes in Solid Liquid Media" *Chemical Review* 93 381–433 1993 No month.
Abstract of patent, JP 04–351603 (Dec. 7, 1992) No month.
Abstract of patent, JP 04–351602 1992 No month.
Derwent Publications Ltd., London, JP 404314769 (Citizen Watch Co. Ltd.), Nov. 5, 1992. (Abstract) No month.

Abstract of patent, JP 04315739 1992 No month.
Derwent Publications Ltd., London, JP 04300395 (Funai Denki KK), Oct. 23, 1992. (Abstract) No month.
Derwent Publications Ltd., London, JP 404213374 (Mitsubishi Kasei Corp), Aug. 4, 1992. (Abstract) No month.
Abstract of patent, JP 04–210228 1992 No month.
Abstract Of Patent, JP 404202571 (Canon Inc.), Jul. 23, 1992. (Abstract) No month.
Abstract Of Patent, JP 404202271 (Mitsubishi Kasei Corp.), Jul. 23, 1992. (Abstract) No month.
Derwent WPI, JP 4–197657 (Toshiba KK) Jul. 17, 1992, abstract. No month.
Derwent Publication Ltd., London, JP 4–189877 (Seiko Epson Corp), Jul. 8, 1992. (Absract) No month.
Derwent Publications Ltd., London, JP 404189876 (Seiko Epson Corp), Jul. 8, 1992. (Abstract) No month.
Abstract Of Patent, JP 404189877 (Seiko Epson Corp.), Jul. 8, 1992. (Abstract) No month.
Derwent Publications Ltd., London, J,A, 4–170479 (Seiko Epson Corp), Jun. 18, 1992. (Abstract) No month.
Abstract of patent, JP 04–81402 1992 No month.
Abstract of patent, JP 04–81401 1992 No month.
Kogelschatz "Silent–discharge driven excimer UV sources and their applications" *Applied Surface Science* 410–423 1992 No month.
Derwent Publications, Ltd., London, JP 403269167 (Japan Wool Textile KK), Nov. 29, 1991 (Abstract) No month.
Derwent Publications Ltd., London, JO 3247676 (Canon KK), Nov. 5, 1991 (Abstract) No month.
Abstract of patent, JP 03–220384 1991 No month.
Patent Abstracts of Japan, JP 03184896 (Dainippon Printing Co Ltd.) Aug. 12, 1991 No month.
Derwent Publications Ltd., London, JP 3167270 (Mitsubishi Kasei Corp), Jul. 19, 1991. (Abstract) No month.
Derwent Publications Ltd., London, JO 3167270 (Mitsubishi Kasei Corp.), Jul. 19, 1991 (Abstract) No month.
Derwent World Patents Index EP 435536 (Canon KK) Jul. 3, 1991. abstract No month.
Derwent Publications Ltd., London, JO 3093870 (Dainippon Ink Chem KK.), Apr. 18, 1991 (Abstract) No month.
Abstract of patent, JP 06369890 1991 No month.
Kogelschatz, U. et al. "New Excimer UV Sources for Industrial Applications" *ABB Review* 391 1–10 1991 No month.
Kogelschatz, U. et al. "New Excimer UV Sources for Industrial Applications" *ABB Review* 391 1–10 1991 No month.
Abstract of patent, JP 03–41165 1991 No month.
"Coloring/Decoloring Agent for Tonor Use Developed" *Japan Chemical Week* 1991 No month.
Braithwaite, M., et al. "Formulation " *Chemistry & Technology of UV & EB Formulation for Coatings, Inks & Paints* IV 11–12 1991 No month.
*Scientific Polymer Products, Inc. Brochure* 24–31 1991 No month.
Dietliker, K. "Photoiniators for Free Radical and Cationic Polymerisation" *Chem & Tech of UV & EB Formulation for Coatings, Inks & Paints* III 61, 63, 229–232, 280, 405, 1991 No month.
Esrom et al. "Large area Photochemical Dry Etching of Polymers iwth Incoherent Excimer UV Radiation" *MRS Materials Research Society* 1–7 1991 No month.

Esrom et al. Excimer Laser–Induced Decomposition of Aluminum Nitride *Materials Research Society Fall Meeting* 1–6 1991 No month.

Esrom et al. "Metal deposition with a windowless VUV excimer source" *Applied Surface Science* 1–5 1991 No month.

Esrom "Excimer Laser–Induced Surface Activation of Aln for Electroless Metal Deposition" *Mat. Res. Sco.1Symp. Proc.* 204 457–465 1991 No month.

Zhang et al. "UV–induced decompositin of adsorbed Cu–aceytlacetonate films at room temperature for electroless metal plating" *Applied Surface Science* 1–6 1991 No month.

"Coloring/Decoloring Agent for Tonor Use Developed" *Japan Chemical Week* 1991 No month.

"German company develops reusable paper" *Pulp & Paper* 1991 No month.

Abstract of patent, JP 02289652 1990 No month.

Ohashi et al. "Molecular Mechanics Studies on Inclusion Compounds of Cyanine Dye Monomers and Dimers in Cyclodextrin Cavities," *J. Am. Chem. Soc.* 112 5824–5830 1990 No month.

Kogelschatz et al. "New Incoherent Ultraviolet Excimer Sources for Photolytic Material Deposition," *Laser Und Optoelektronik* 1990 No month.

Patent Abstracts of Japan, JP 02141287 (Dainippon Printing Co Ltd.) May 30, 1990. No month.

Abstract of Patent, JP 0297957, (Fuji Xerox Co., Ltd.) 1990 No month.

Derwent Publications Ltd., London, JP 2091166 (Canon KK), Mar. 30, 1990. (Abstract) No month.

Esrom et al. "Metal Deposition with Incoherent Excimer Radiation" *Mat. Res. Soc. Symp. Proc.* 158 189–198 1990 No month.

Esrom "UV Excimer Laser–Induced Deposition of Palladium from palladiym Acetate Films" *Mat. Res. Soc. Symp. Proc.* 158 109–117 1990 No month.

Kogelschatz, U. "Silent Discharges for the Generation of ultraviolet and vacuum ultraviolet excimer radiation" *Pure & Applied Chem.* 62 1667–74 1990 No month.

Esrom et al. "Investigation of the mechanism of the UV–induced palladium depostions processf from thin solid palladium acetate films" *Applied Surface Science* 46 158–162 1990 No month.

Zhang et al. "VUV synchrotron radiation processing of thin palladium acetate spin–on films for metallic surface patterning" *Applied Surface Science* 46 153–157 1990 No month.

Brennan et al. "Stereoelectronic effects in ring closure reactions: the 2'-hydroxychalcone—flavanone equilibrium, and related systems," *Canadian J. Chem.* 68 (10) pp. 1780–1785 1990 No month.

Abstract of patent, JP 01–299083 1989 No month.

Derwent Publications Ltd., London, J,0, 1182379 (Canon KK), Jul. 20, 1989, (Abstract) No month.

Derwent Publications Ltd., London, JO 1011171 (Mitsubishi Chem Ind. KK.), Jan. 13, 1989 (Abstract) No month.

Gruber, R.J., et al. "Xerographic Materials" *Encyclopedia of Polymer Science and Engineering* 17 918–943 1989 No month.

Pappas, S.P. "Photocrosslinking" *Comph. Pol. Sci.* 6 135–148 1989 No month.

Pappas, S.P. "Photoinitiated Polymerization" *Comph. Pol. Sci.* 4 337–355 1989 No month.

Kirilenko, G.V. et al. "An analog of the vesicular process with amplitude modulation of the incident light beam" *Chemical Abstracts* 111 569 [No. 111:12363 3b] 1989 No month.

Esrom et al. "UV excimer laser–induced pre–nucleation of surfaces followed by electroless metallization" *Chemtronics* 4 216–223 1989 No month.

Esrom et al. "VUV light–induced depostion of palladium using an incoherent Xe2* excimer source" *Chemtronics* 4 1989 No month.

Esrom et al. "UV Light–Induced Deposition of Copper Films" C5–719–C5–725 1989 No month.

Falbe et al. *Rompp Chemie Lexikon* 9 270 1989 No month.

Allen, Norman S. *Photopolymerisation and Photoimaging Science and Technology* pp. 188–199; 210–239 1989 No month.

Derwent Publications, Ltd., London, SU 1423656 (Kherson Ind Inst), Sep. 15, 1988 (Abstract) No month.

Derwent Publications, Ltd., London, EP 0280653 (Ciba GeighyAG), Aug. 31, 1988 (Abstract) 1988 No month.

Abstract of patent, JP 63–190815 1988 No month.

Patent Abstracts of Japan, JP 63179985 (Tomoegawa Paper Co. Ltd.), Jul. 23, 1988 No month.

Derwent World Patents Index, JP 63179977 (Tomoegawa Paper Mfg Co Ltd), Jul. 23, 1988 No month.

Furcone, S.Y. et al. "Spin–on B14Sr3Ca3Cu4O16+× superconducting thin films from citrate precursors," *Appl. Phys. Lett.* 52(2 5) 2180–2182 1988 No month.

Abstract of patent, JP 63–144329 1988 No month.

Abstract of patent, JP 63–130164 1988 No month.

Derwent Publications, Ltd., London. J6 3112770 (Toray Ind Inc), May 17, 1988 (Abstract) 1988 No month.

Derwent Publications, Ltd., London, J6 3108074 (Konishiroku Photo KK), May 12, 1988 (Abstract) No month.

Derwent Publications, Ltd., London,J6 3108073 (Konishiroku Photo KK), May 12, 1988 (Abstract) No month.

Abstract of patent, JP 61–77846 1988 No month.

Abstract of patent, JP 63–73241 1988 No month.

Abstract of patent, JP 63–47762, 1988 No month.

Abstract of patent, JP 63–47763, 1988 No month.

Abstract of patent, JP 63–47764, 1988 No month.

Abstract of patent, JP 63–47765 1988 No month.

Eliasson, B., et al. "UV Excimer Radiation from Dielectric–Barrier Discharges" *Applied Physics B* 46 299–303 1988 No month.

Eliasson et al. "New Trends in High Intensity UV Generation" *EPA Newsletter* (32) 29–40 1988 No month.

Cotton, F.A. "Oxygen: Group Via(16)" *Advanced Inorganic Chemistry* 5th ed. 473–474 1988 No month.

Derwent Publications, Ltd., London, J6 2270665 (Konishiroku Photo KK), Nov. 25, 1987 (Abstract) No month.

Abstract of patent, JP 62–215261 1987 No month.

Derwent World Patents Index JP 62064874 (Dainichiseika Color & Chem Mfg.), Mar. 23, 1987. abstract No month.

Derwent World Patents Index JP 62064874 (Dainichiseika Color & Chem Mfg.), Mar. 23, 1987. abstract No month.

Database WPI, Derwent Publications Ltd., London, JP 62032082 (Mitsubishi Denki KK), Feb. 12, 1987. (Abstract) No month.

Abstract of patent, JP 62–32082 1987 No month.

Derwent Publications Ltd., London, J6 2007772 (Alps Electric KK.), Jan. 14, 1987 (Abstract) No month.

Gross et al. "Laser direct–write metallization in thin palladium acetate films" *J. App. Phys.* 61 (4) 1628–1632 1987 No month.

Al–Ismail et al. "Some experimental results on thin polypropylene films loaded with finely–dispersed copper" *Journal of Materials Science* 415–418 1987 No month.

Baufay et al. "Optical self–regulation during laser–induced oxidation of copper" *J. Appl. Phys* 61 (9) 4640–4651 1987 No month.

Al–Ismail et al. "Some experimental results on thin polypropylene films loaded with finely–dispersed copper" *Journal of Materials Science* 415–418 1987 No month.

Gross et al. "Laser direct–write metallization in thin palladium acetate films" *J. App. Phys.* 61 (4) 1628–1632 1987 No month.

Derwent Publications Ltd., London, JA 0284478 (Sanyo Chem Ind Ltd.), Dec. 15, 1986 (Abstract) No month.

Abstract of patent, JP 61251842 1986 No month.

Database WPI, Derwent Publications Ltd., London, GB; SU, A, 1098210 (Kutulya L A) Jun. 23, 1986. No month.

Abstract of patent, JP 61–97025 1986 No month.

Abstract of patent, JP 61–87760 1986 No month.

Derwent Publications Ltd., London, DL 0234731 (Karl Marx Univ. Leipzig), Apr. 9, 1986. (Abstract) No month.

Derwent World Patents Index, SU 1219612 (AS USSR NON–AQ SOLN) Mar. 23, 1986. No month.

Derwent Publications, Ltd., London, J6 1041381 (Osaka Prefecture). Feb. 27, 1986 (Abstract) No month.

Dialog, JAPIO, JP 61–034057 (Ciba Geigy AG) Feb. 18, 1986. No month.

Derwent World Patents Index, JP 61027288 (sumitomo Chem Ind KK) Feb. 6, 1986. No month.

Sakai et al. "A Novel and Practical Synthetic Method of 3(2H)–Furanone Derivatives," *J. Heterocyclie Chem.* 23 pp. 1199–1201 1986 No month.

Jellinek, H.H.G. et al. "Evolution of H2O and CO2 During the Copper–Catalyzed Oxidation of Isotactic Polypropylene," *J. Polymer Sci*, 24 389–403 1986 No month.

Jellinek, H.H.G. et al. "The Diffusion of Ca2+ Catalysts from Cu–Metal Polymer or Cu–Oxide/Polymer Interfaces into Isotactic Polypropylene," *J. Polymer Sci.* 24 503–510 1986 No month.

John J. Eisch and Ramiro Sanchez "Selective, Oxophilic Imination of Ketones with Bis (dichloroaluminum) Phenylimide" *J. Org. Chem.* 51 (10) 1848–1852 1986 No month.

Derwent Publications Ltd., London, J6 0226575 (Sumitomo Chem Ind Ltd.), Oct. 11, 1985 (Abstract) 1985 No month.

Abstract of patent, JP 60–156761 1985 No month.

Derwent World Patents Index DE 3443565 (Mitsubishi Yuka Fine Che. et al.) Jul. 11, 1985. abstract No month.

Derwent Publications Ltd., London, J,A, 0011451 (Fugi Photo Film KK), Jan. 21, 1985. (Abstract) No month.

Derwent Publications, Ltd., London J6 0011449 –A (Taoka Chemical KK) Jan. 21, 1985 (abstract) No month.

Derwent World Patents Index JP 60–008088 (Mitsubishi Paper Mills Ltd.) Jan. 16, 1985. abstract No month.

Roos, G. et al. "Textile applications of photocrosslinkable polymers" *Chemical Abstracts* 103 57 [No. 103:23690j ] 1985 No month.

Beck, M.T., et al. Mechanism of the autophotosensitized formulation of porphyrins in the reaction of pyrrole and m–disulfonated *Chemical Abstracts* 198 5:45 362 1985 No month.

Derwent World Patents Index, EP 127574 (Ciba Geigy AG), Dec. 5, 1984 No month.

Derwent Publications Ltd., London, JP 0198187 (Canon KK), Nov. 9, 1984. (Abstract) No month.

Derwent Publications Ltd., London, J,A, 0169883 (Ricoh KK), Sep. 25, 1984. (Abstract) No month.

Derwent Publications Ltd., London, JA 0169883 (Ricoh KK), Sep. 25, 1984 (Abstract) No month.

Derwent Publications Ltd., London, JA 0198187 (Canon KK), Nov. 9, 1984 (Abstract) No month.

Derwent Publications Ltd., London, J,A, 0053563 (Dainippon Toryo KK), Mar. 28, 1984. (Abstract) No month.

Derwent Publications Ltd., London, J,A, 0053562 (Dainippon Toryo KK), Mar. 28, 1984. (Abstract) No month.

Abstract Of Patent, JA 0053563 (Dainippon Toryo KK), Mar. 28, 1984 (Abstract) No month.

Abstract Of Patent, JA 0053562 (Dainippon Toryo KK), Mar. 28, 1984 (Abstract) No month.

Derwent Publications Ltd., London, J,A, 0051961 (Dainippon Toryo KK), Mar. 26, 1984). (Abstract) No month.

Abstract Of Patent, JA 0051961 (Dainippon Toryo KK), Mar. 26, 1984 (Abstract) No month.

Saenger, W. "Structural Aspects of Cyclodextrins and Their Inclusion Complexes" *Inclusion Compounds—Structural Aspects of Inclusion Compounds formed by Organic Host* 2 231–259 1984 No month.

Szejtli "Industrial Applications of Cyclodextrins" *Inclusion Compounds: Physical Prop. & Applns* 3 331–390 1984 No month.

Kano et al. "Three–Component Complexes of Cyclodextrins. Exciplex Formation in Cyclodextrin Cavity," *J. Inclusion Phenomena* 2 pp. 737–746 1984 No month.

Suzuki et al. "Spectroscopic Investigation of Cyclodextrin Monomers, Derivatives, Polymers and Azo Dyes," *J. Inclusion Phenomena* 2, pp. 715–724 1984 No month.

Abstract Of Patent, JA 0222164 (Ricoh KK), Dec. 23, 1983 (Abstract) 1983 No month.

Abstract of patent, JP 58211426 (Sekisui Plastics KK), (Dec. 8, 1983) No month.

Derwent Publications, Ltd., London, EP 0072775 (Ciba Geigy AG), Feb. 23, 1983 (Abstract) No month.

van Beek, H.C.A "Light–Induced Colour Changes in Dyes and Materials" *Color Res. and Appl.* 8 176–181 1983 No month.

Connors, K.A. "Application of a stoichiometric model of cyclodextrin complex formation" *Chemical Abstracts* 98 598 [No. 98:53067g] 1983 No month.

Abstract Of Patent, EP 0065617 (IBM Corp.), Dec. 1, 1982 (Abstract). No month.

Derwent Publications Ltd., London, J,A, 0187289 (Honshu Paper Mfg KK), Nov. 17, 1982. (Abstract) No month.

Abstract Of Patent, JA 0187289 (Honsho Paper Mfg KK), Nov. 17, 1982 (Abstract) No month.

Abstract Of Patent, JA 0185364 (Ricoh KK), Nov. 15, 1982 (Abstract) No month.

Derwent Publications, Ltd., London J5 7139146 (Showa Kako KK) Aug. 27, 1982 (abstract) No month.

Abstract Of Patent, JA 0090069 (Canon KK), Jun. 4, 1982 (Abstract) No month.

Derwent Publications, Ltd., London, JA 0061785 (Nippon Senka KK), Apr. 14, 1982 (Abstract) No month.

Fischer, "Submicroscopic contact imaging with visible light by energy transfer" *Appl. Phys. Letter* 40(3) 1982 No month.

Abstract Of Patent, JA 0010659 (Canon KK), Jan. 20, 1982 (Abstract) No month.

Abstract Of Patent, JA 0010661 (Canon KK), Jan. 20, 1982 (Abstract) No month.

Christen "Carbonylverbindungen: Aldehyde und Ketone," *Grundlagen der Organischen Chemie* 255 1982 No month.

Derwent Publications Ltd., London, J,A, 0155263 (Canon KK), Dec. 1, 1981. (Abstract) No month.

Abstract Of Patent, JA 0155263 (Canon KK), Dec. 1, 1981 (Abstract) No month.

Abstract Of Patent, JA 0147861 (Canon KK), Nov. 17, 1981 (Abstract) No month.

Derwent Publications Ltd., London, J,A, 0143273 (Canon KK), Nov. 7, 1981. (Abstract) No month.

Abstract Of Patent, JP 56143272 (Canon KK), Nov. 7, 1981 (Abstract) No month.

Abstract Of Patent, JA 0136861 (Canon KK), Oct. 26, 1981 (Abstract) No month.

Abstract Of Patent, JA 6133378 (Canon KK), Oct. 19, 1981 (Abstract) No month.

Abstract Of Patent, JA 6133377 (Canon KK), Oct. 19, 1981 (Abstract) No month.

Abstract Of Patent, JA 6093775 (Canon KK), Jul. 29, 1981 (Abstract) No month.

Derwent Publications Ltd., London, J,A, 0008135 (Ricoh KK), Jan. 27, 1981. (Abstract) No month.

Derwent Publications Ltd., London, J,A, 0004488 (Canon KK), Jan. 17, 1981. (Abstract) No month.

Abstract Of Patent, JA 0004488 (Canon KK), Jan. 17, 1981 (Abstract) No month.

Kirk–Othmer "Metallic Coatings," *Encyclopedia of Chemical Technology* 15 241–274 1981 No month.

Komiyama et al. "One–Pot Preparation of 4–Hydroxychalcone β–Cyclodextrin as Catalyst," *Makromol. Chem.* 2 733–734 1981 No month.

Derwent Publications, Ltd., London CA 1086–719 (Sherwood Medical) Sep. 30, 1980 (abstract) No month.

Derwent Publications Ltd., Database WPI, JP 55 113036 (Ricoh KK), Sep. 1, 1980 No month.

Rosanske et al. "Stoichiometric Model of Cyclodextrin Complex Formation" *Journal of Pharmaceutical Sciences* 69 (5) 564–567 1980 No month.

Semple et al. "Synthesis of Functionalized Tetrahydrofurans," *Tetrahedron Letters* 81 pp. 4561–4564 1980 No month.

Kirk–Othmer "Film Deposition Techniques," *Encyclopedia of Chemical Technology* 10 247–283 1980 No month.

Derwent World Patents Index, Derwent Info. Ltd., JP 54158941 (Toyo Pulp KK), Dec. 15, 1979. (Abstract) No month.

Derwent World Patents Index, JP 54117536 (Kawashima F) Sep. 12, 1979.

Derwent Publications Ltd., London, J,A, 005422 (Fuji Photo Film KK), Jan. 16, 1979. (Abstract) No month.

Drexhage et al. "Photo–bleachable dyes and processes" *Research Disclosure* 85–87 1979 No month.

"Color imaging devices and color filter arrays using photo–bleachable dyes" *Research Disclosure* 22–23 1979 No month.

Wolff, N.E., et al. "Electrophotography" *Kirk–Othmer Encyclopedia of Chemical Technology* 8 794–826 1979 No month.

Derwent Publications Ltd., London, J,A, 0012037 (Pentel KK), Jan. 29, 1977. (Abstract) No month.

Abstract Of Patent, JA 0012037 (Pentel KK), Jan. 29, 1977 (Abstract) No month.

Jenkins, P.W. et al. "Photobleachable dye material" *Research Disclosure* 18 [No. 12932] 1975 No month.

Lamberts, R.L. "Recording color grid patterns with lenticules" *Research Disclosure* 18–19 [No. 12923] 1975 No month.

Karmanova, L.S. et al. "Light stabilizers of daytime fluorescent paints" *Chemical Abstracts* 82 147 [No. 59971p] 1975 No month.

Prokopovich, B. et al. "Selection of effective photoinducers for rapid hardening of polyester varnish PE–250" *Chemical Abstracts* 83 131 [No. 81334a] 1975 No month.

"Variable Contrast Printing System" *Research Disclosure* 19 [No. 12931] 1975 No month.

Lakshman "Electronic Absorption Spectrum of Copper Formate Tetrahydrate" *Chemical Physics Letters* 31 (2) 331–334 1975 No month.

Derwent Publications, Ltd., London J4 9131–226 (TNational Cash Register C) Dec. 16, 1974 (abstract).

Chang, I.F., et al. "Color Modulated Dye Ink Jet Printer" *IBM Technical Disclosure Bulletin* 17(5) 1520–1521 1974 No month.

"Darcur 1173: Liquid Photoiniator for Ultraviolet Curing of Coatings" 1974.

Hosokawa et al. "Ascofuranone, an antibiotic from Ascochyta," Japan Kokai 73 91,278 (Nov. 28, 1973) *MERCK Index* 80 p. 283; abstract 94259t No month.

Abstract of patent, NL 7112489 (Dec. 27, 1971). No month.

Gafney et al. "Photochemical Reactions of Copper (II)—1, 3–Diketonate Complexes" *Journal of the Americqal Chemical Society* 1971 No month.

Derwent Publications, Ltd., London SU 292698–S Jan. 15, 1971 (abstract) No month.

Derwent World Patents Index,CS 120380 (Kocourek, Jan) Oct. 15, 1966. No month.

Tsuda, K., et al. Vinyl Polymerization. CXLVI. The influence of dibenzoyl disulfide derivatives on radical polymerizations *Chemical Abstract* 196 6:29 198 1966 No month.

Rigdon, J.E. "In Search of Paper that Spies Can't Copy" *Wall Street Journal* No date.

Chatterjee,S. et al. "Photochemistry of Carbocyanine Alkyltriphenylborate Salts: Intra–Ion–Pair Electron Transfer and the Chemistry of Boranyl Radicals" *J. Am. Chem. Soc.* 112 6329–6338 No date.

"Assay—Physical and Chemical Analysis of Complexes" *AMAIZO* No date.

"Cyclodextrin" *AMAIZO* No date.

"Beta Cyclodextrin Polymer (BCDP)" *AMAIZO* No date.

"Chemically Modified Cyclodextrins" *AMAIZO* No date.

"Cyclodextrin Complexation" *American Maize Products Co.* No date.

"Monomers" *Scientific Polymer Products Inc.* No date.

Suppan, Paul "Quenching of Excited States" *Chemistry and Light* 65–69 No date.

Yamaguchi, H. et al. "Supersensitization. Aromatic ketones as supersensitizers" *Chemical Abstracts* 53 107 (d) No date.

Stecher, H. "Ultraviolet–absorptive additives in adhesives, lacquers and plastics" *Chemicals Abstracts* 53 14579 (c) No date.

Maslennikov, A.S. "Coupling of diazonium salts with ketones" *Chemical Abstracts* 60 3128e No date.

Derwent Publications Ltd., London, 4 9128022 No date.

Abstract of Patent, JP 405195450 No date.

Rose, Philip I. "Gelatin," *Encyclopedia of Chemical Technology* 7 488–513 No date.

NEONANOPLASTS AND MICROEMULSION TECHNOLOGY FOR INKS AND INK JET PRINTING

CROSS-REFERENCE TO RELATED PATENT APPLICATION

This patent application claims priority to provisional patent application No. 60/087,893, filed Jun. 3, 1998.

TECHNICAL FIELD

The present invention relates to colorant compositions containing neonanoplasts. The colorant compositions exhibit improved color brightness and brilliance due to the incorporation of one or more colorants in the neonanoplasts. The colorant compositions may be printed onto virtually any substrate. The colorant compositions of the present invention have particular utility in the area of printed textiles.

BACKGROUND OF THE INVENTION

A major problem with colorants is that they tend to fade when exposed to electromagnetic radiation such as sunlight or artificial light and the like. It is believed that most of the fading of colorants when exposed to light is due to photodegradation mechanisms. These degradation mechanisms include oxidation or reduction of the colorants depending upon the environmental conditions in which the colorant is placed. Fading of a colorant also depends upon the substrate upon which they reside.

Product analysis of stable photoproducts and intermediates has revealed several important modes of photodecomposition. These include electron ejection from the colorant, reaction with ground-state or excited singlet state oxygen, cleavage of the central carbon-phenyl ring bonds to form amino substituted benzophenones, such as triphenylmethane dyes, reduction to form the colorless leuco dyes and electron or hydrogen atom abstraction to form radical intermediates.

Various factors such as temperature, humidity, gaseous reactants, including $O_2$, $O_3$, $SO_2$, and $NO_2$, and water soluble, nonvolatile photodegradation products have been shown to influence fading of colorants. The factors that effect colorant fading appear to exhibit a certain amount of interdependence. It is due to this complex behavior that observations for the fading of a particular colorant on a particular substrate cannot be applied to colorants and substrates in general.

Under conditions of constant temperature it has been observed that an increase in the relative humidity of the atmosphere increases the fading of a colorant for a variety of colorant-substrate systems (e.g., McLaren, K., *J. Soc. Dyers Colour*, 1956, 72, 527). For example, as the relative humidity of the atmosphere increases, a fiber may swell because the moisture content of the fiber increases. This aids diffusion of gaseous reactants through the substrate structure.

The ability of a light source to cause photochemical change in a colorant is also dependent upon the spectral distribution of the light source, in particular the proportion of radiation of wavelengths most effective in causing a change in the colorant and the quantum yield of colorant degradation as a function of wavelength. On the basis of photochemical principles, it would be expected that light of higher energy (short wavelengths) would be more effective at causing fading than light of lower energy (long wavelengths). Studies have revealed that this is not always the case. Over 100 colorants of different classes were studied and found that generally the most unstable were faded more efficiently by visible light while those of higher lightfastness were degraded mainly by ultraviolet light (McLaren, K., *J. Soc. Dyers Colour*, 1956, 72, 86).

The influence of a substrate on colorant stability can be extremely important. Colorant fading may be retarded or promoted by a chemical group within the substrate. Such a group can be a ground-state species or an excited-state species. The porosity of the substrate is also an important factor in colorant stability. A high porosity can promote fading of a colorant by facilitating penetration of moisture and gaseous reactants into the substrate. A substrate may also act as a protective agent by screening the colorant from light of wavelengths capable of causing degradation.

The purity of the substrate is also an important consideration whenever the photochemistry of dyed technical polymers is considered. For example, technical-grade cotton, viscose rayon, polyethylene, polypropylene, and polyisoprene are known to contain carbonyl group impurities. These impurities absorb light of wavelengths greater than 300 nm, which are present in sunlight, and so, excitation of these impurities may lead to reactive species capable of causing colorant fading (van Beek, H. C. A., *Col. Res. Appl.*, 1983, 8(3), 176).

Mother nature protects naturally-occurring colorants from one or more of the above-described photodegradation mechanisms by surrounding the naturally-occurring colorants with a cell wall. The cell wall prevents destructive materials, such as $O_2$ gas, from reaching the colorant. The result is a colorant, which maintains its brilliance, brightness and beauty even when exposed to sunlight day after day.

What is needed in the art is a colorant system, which provides protection to a colorant in much the same way that nature protects colorants. There exists a need for methods and compositions, which are capable of stabilizing a wide variety of colorants, regardless of the stability of the colorant, from the effects of both sunlight and artificial light.

SUMMARY OF THE INVENTION

The present invention addresses the needs described above by providing compositions and methods for stabilizing colorants against radiation including radiation in the visible wavelength range. The present invention provides a system for shielding a colorant from destructive forces, such as oxidants and reductants. By providing a protective shield for the colorant, very unstable colorful dyes may be used in a wide variety of printing applications, which were believed to be impossible applications due to rapid degradation of the dye.

The present invention is directed to neonanoplasts formed by microemulsion technology. The neonanoplasts contain one or more colorants and optionally colorant stabilizers. The neonanoplasts comprise a polymeric membrane, which prevents degradable materials from reaching the colorant. The neonanoplasts may be incorporated into a variety of liquid mediums to form colorant compositions.

The present invention is further directed to a method of stabilizing a colorant by encapsulating the colorant in a polymeric membrane, forming a neonanoplast. In one embodiment of the present invention, one or more colorant stabilizers are also encapsulated in the polymeric membrane, creating multiple levels of colorant protection from photodegradable mechanisms.

The present invention is also directed to colorant compositions containing the above-described neonanoplasts. The colorant compositions may be applied to any substrate to impart a color to the substrate. In one embodiment of the present invention, a colorant composition comprising neonanoplasts, a liquid medium and a pre-polymer is coated onto a substrate and subsequently exposed to radiation to fix the neonanoplast to the substrate via the polymerization of the pre-polymer.

In another embodiment of the present invention, neonanoplasts are present in a polymer coating of a heat transfer product, such as is used for transferring graphic images onto clothing.

The neonanoplasts are particularly effective in ink jet inks. Use of the neonanoplasts, as described herein, intensifies the colors and stabilizes the colorants when exposed to light and other potentially degrading conditions. Additionally, the neonanoplasts are particularly effective in coatings for paper products and textiles.

These and other features and advantages of the present invention will become apparent after a review of the following detailed description of the disclosed embodiments and the appended claims.

DETAILED DESCRIPTION OF THE INVENTION

The present invention is directed to neonanoplasts formed by microemulsion technology. Neonanoplasts are spherically-shaped polymeric membranes which encapsulates a colorant, and optionally other materials, to prevent degradable materials from reaching the colorant. Neonanoplasts can be formed by a microemulsion process. Neonanoplasts may have an average particle size of less than about 1000 nanometers (nm), desirably less than 500 nm. The neonanoplasts may be incorporated into a variety of mediums to form colorant compositions.

The present invention is further directed to a method of stabilizing a colorant by encapsulating the colorant in a polymeric membrane, forming a neonanoplast. In one embodiment of the present invention, one or more colorant stabilizers are encapsulated in the polymeric membrane, creating multiple levels of colorant protection from photodegradable mechanisms. Suitable colorant stabilizers include any colorant stabilizer, which does not negatively effect the polymeric membrane of the neonanoplast.

In order to describe the various embodiments of the present invention, the following definitions are provided. As used herein, the term "microemulsion" is used herein to mean a multiple phase system containing, at the minimum, an aqueous phase and a non-aqueous phase in physical contact with one another.

As used herein, the term "colorant" is meant to include, without limitation, any material, which typically will be an organic material, such as an organic colorant or dye. The term is meant to include a single material or a mixture of two or more materials.

The term "light-stable" is used herein to mean that the colorant, when encapsulated within a neonanoplast and/or associated with a colorant stabilizing molecules, is more stable to electromagnetic radiation, including, but not limited to, sunlight or artificial light, than when the colorant is not encapsulated by a neonanoplast and/or associated with such a compound.

The term "molecular includant," as used herein, is intended to mean any substance having a chemical structure which defines at least one cavity. That is, the molecular includant is a cavity-containing structure. As used herein, the term "cavity" is meant to include any opening or space of a size sufficient to accept at least a portion of the colorant.

The term "functionalized molecular includant" is used herein to mean a molecular includant to which one or more molecules of a colorant stabilizer are covalently coupled to each molecule of the molecular includant. The term "degree of substitution" is used herein to refer to the number of these molecules or leaving groups (defined below) which are covalently coupled to each molecule of the molecular includant.

The term "derivatized molecular includant" is used herein to mean a molecular includant having more than two leaving groups covalently coupled to each molecule of molecular includant. The term "leaving group" is used herein to mean any leaving group capable of participating in a bimolecular nucleophilic substitution reaction. Examples of molecular includants include, but are not limited to, the cyclodextrins.

The term "artificial light" is used herein to mean light having a relatively broad bandwidth that is produced from conventional light sources, including, but not limited to, conventional incandescent light bulbs and fluorescent light bulbs.

Forming Neonanoplasts

The present invention is further directed to a method of forming neonanoplasts. One method of forming the neonanoplasts of the present invention comprises forming a non-aqueous solution containing an organic solvent and a surfactant. Suitable organic solvents include, but are not limited to, n-hexane, heptane, octane, n-alkanes, branched alkanes. Suitable surfactants include, but are not limited to, Aerosol TO or dioctyl sodium sulfosuccinate, TRITON® X-100 and fatty acid salts. In a separate container, an aqueous solution is prepared containing at least one monomer and at least one colorant. Suitable monomers include, but are not limited to, acrylates, acrylamides and methacrylates.

Suitable colorants include, but are not limited to, dyes and pigments. The colorant may be an organic dye. Organic dye classes include, by way of illustration only, triarylmethyl dyes, such as Malachite Green Carbinol base {4-(dimethylamino)-a-[4-(dimethylamino)phenyl]-a-phenyl-benzene-methanol}, Malachite Green Carbinol hydrochloride {N-4-[[4-(dimethylamino)phenyl]phenyl-methylene]-2,5-cyclohexyldien-1-ylidene]-N-methyl-methanaminium chloride or bis[p-(dimethylamino)phenyl]phenylmethylium chloride}, and Malachite Green oxalate {N-4-[[4-(dimethylamino)-phenyl]-phenytmethylene]-2,5-cyclohexyldien-1-ylidene]-N-methyl-methanaminium chloride or bis[p-(dimethyl-amino)-phenyl]phenylmethylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and β-Naphthol Orange; thiazine dyes, such as Methylene Green, zinc chloride double salt [3,7-bis (dimethylamino)-6-nitrophenothiazin-5-ium chloride, zinc chloride double salt]; oxazine dyes, such as Lumichrome (7,8-dimethylalloxazine); naphthalimide dyes, such as Lucifer Yellow CH {6-amino-2-[(hydrazino-carbonyl)amino]-2,3-dihydro-1,3-dioxo-1H-benz[de]iso-quinoline-5,8-disulfonic acid dilithium salt}; azine dyes, such as Janus Green B {3-(diethylamino)-7-[[4-(dimethyl-amino)phenyl]azo]-5-phenylphenazinium chloride}; cyanine dyes, such as Indocyanine Green {Cardio-Green or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolium hydroxide inner salt sodium salt}; indigo dyes, such as Indigo {Indigo Blue or Vat Blue 1; 2-(1,3-dihydro-3-oxo-2H-indol-2-ylidene)-1,2-dihydro-3H-indol-3-one}; coumarin dyes, such as 7-hydroxy-4-methylcoumarin (4-methylumbelliferone); benzimidazole dyes, such as Hoechst 33258 [bisbenzimide or 2-(4-hydroxyphenyl)-5-(4-methyl-1-piperazinyl)-2,5-bi-1H-benzimidazole trihydro-chloride pentahydrate]; paraquinoidal dyes, such as Hematoxylin {Natural Black 1; 7,11b-dihydrobenz[b]-indeno[1,2-d]pyran-3,4,6a,9,10(6H)-pentol}; fluorescein dyes, such as Fluoresceinamine (5-aminofluorescein); diazonium salt dyes, such as Diazo Red RC (Azoic Diazo No. 10 or Fast Red RC salt; 2-methoxy-5-chlorobenzenediazonium chloride, zinc chloride double salt); azoic diazo dyes, such as Fast Blue BB salt (Azoic Diazo No. 20; 4-benzoylamino-2,5-diethoxy-benzene diazonium chloride, zinc chloride double salt); phenylenediamine dyes, such as Disperse Yellow 9 [N-(2,4-dinitrophenyl)-1,4-phenylenediamine or Solvent Orange 53]; diazo dyes, such as Disperse Orange 13 [Solvent Orange 52; 1-phenylazo-4-(4-hydroxyphenylazo) naphthalene]; anthra-quinone dyes, such as Disperse Blue 3 [Celliton Fast Blue FFR; 1-methylamino-4-(2-hydroxyethylamino)-9,10-anthraquinone], Disperse Blue 14 [Celliton Fast Blue B; 1,4-bis(methylamino)-9,10-anthraquinone], and Alizarin Blue Black B (Mordant Black 13); trisazo dyes, such as Direct Blue 71 {Benzo Light Blue FFL or Sirius Light Blue BRR; 3-[(4-[(4-[(6-amino-1-hydroxy-3-sulfo-2-naphthalenyl)azo]-6-sulfo-1-naphthalenyl)-azo]-1-naphthalenyl)azo]-1,5-naphthalenedisulfonic acid tetrasodium salt}; xanthene dyes, such as 2,7-dichloro-fluorescein; proflavine dyes, such as 3,6-diaminoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1)-[29H,31H-phthalocyanato(2-)-$N^{29}$, $N^{30},N^{31},N^{32}$]-copper}; carotenoid dyes, such as trans-β-carotene (Food Orange 5); carminic acid dyes, such as Carmine, the aluminum or calcium-aluminum lake of carminic acid (7-a-D-glucopyranosyl-9,10-dihydro-3,5,6,8-tetrahydroxy-1-methyl-9,10-dioxo-2-anthracene-carbonylic acid); azure dyes, such as Azure A [3-amino-7-(dimethylamino)phenothiazin-5-ium chloride or 7-(dimethyl-amino)-3-imino-3H-phenothiazine hydrochloride]; and acridine dyes, such as Acridine Orange [Basic Orange 14; 3,8-bis(dimethylamino)acridine hydrochloride, zinc chloride double salt] and Acriflavine (Acriflavine neutral; 3,6-diamino-10-methylacridinium chloride mixture with 3,6-acridine-diamine).

The aqueous solution is added to the non-aqueous solution while stirring to form a mixture. To the mixture is added an initiator to polymerize the one or more monomers of the aqueous phase. As the polymerization reaction proceeds, the colorant of the aqueous phase is encapsulated by the polymerizing monomer to form microemulsion spheres within the non-aqueous phase. The non-aqueous phase is removed to yield an aqueous phase containing the neonanoplasts. In order to remove the surfactant from the aqueous phase, dialysis bags or some other separation means are used to separate the surfactant from the aqueous phase containing the neonanoplasts. Water is then removed to yield neonanoplasts. The resulting neonanoplasts may have an average particle size of less than about 1000 nm. Desirably, the neonanoplasts have an average particle size of less than about 500 nm. More desirably, the neonanoplasts have an average particle size of less than about 100 nm.

In one embodiment of the present invention, one or more colorant stabilizers are associated with the colorant. By incorporating one or more colorant stabilizers into the aqueous solution described above, colorant stabilizers may be encapsulated within the neonanoplasts along with the colorant. Suitable colorant stabilizers for use in the present invention include, but are not limited to, colorant stabilizers disclosed in U.S. patent applications 08/627,693 filed Mar. 29, 1996 and 08/788,863 filed Jan. 23, 1997, as well as, U.S. Pat. Nos. 5,782,963; 5,855,655; and 5,891,229; all of which are assigned to Kimberly-Clark Worldwide, Inc., the entirity of which is incorporated herein by reference.

In a further embodiment of the present invention, suitable colorant stabilizers include, but are not limited to, a porphine, a metal, a metal salt, a molecular includant or a combination thereof. Particularly suitable porphines include, but are not limited to, porphines having the following structure:

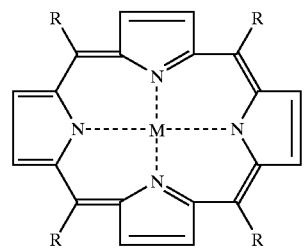

wherein R is any proton-donating moiety and M is iron, cobalt or copper. Desirably, R is $SO_3H$,

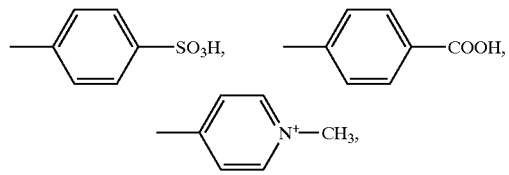

COOH, $R_1$COOH wherein $R_1$ is an alkyl group of from 1 to 6 carbons, or the corresponding salt thereof.

Desirably, the colorant stabilizer is represented by one or more porphines such as Cu-meso-tetra-(4-sulfanatophenyl)-porphine (designated CuTPPS4) and Cu-meso-tetra-(N-methyl-4-pyridyl)-porphine (designated CuTMPS4), having the following structure:

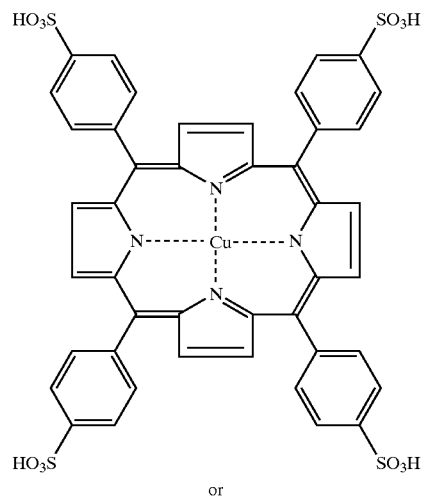

or

-continued

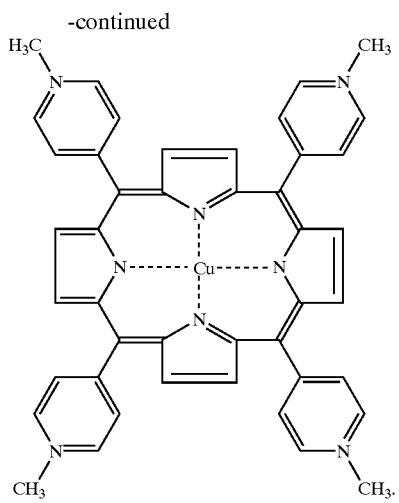

In the above-described porphines, the copper ion can also be substituted with an iron or cobalt ion. It is also understood that in the case of FeTPPS4, CuTPPS4 or CoTPPS4, the sulfuric acid moieties may be substituted with salts when in solution, such as sodium salts. Desirably, the colorant may be stabilized with about 0.1% to 10% wt/wt porphine, more desirably about 0.3% to 1% wt/wt porphine, and even more desirably about 0.5% wt/wt porphine based on the total weight of the colorant containing solution.

In another embodiment of the present invention, the neonanoplasts contain a colorant and a colorant stabilizer in the form of a metal or metal salt, such as a lanthanide or lanthanide salt. Desirably, the amount of metal or metal salt in the colorant solution is from about 0.01% to 10% wt/wt metal, more desirably about 0.03% to 1% wt/wt metal, and even more desirably about 0.05% wt/wt metal. Although lanthanides and lanthanide salts are desired metals, other metals, may also be used such as magnesium, iron, zinc, and other transition metals. To improve the solubility of the metal or metal salt in solution, metal solubility-enhancing agents may be added. Particularly useful metal solubility-enhancing agents include, but are not limited to, chelating agents, including, but not limited to, EDTA (ethylenediaminetetraacetic acid) or EGTA (ethylene glycol-bis(β-aminoethyl ether)).

In a further embodiment of the present invention, the neonanoplasts comprise a colorant in combination with a porphine and a lanthanide, such as europium. Desirably, the amount of porphine in the colorant solution is from about 0.1% to 10% wt/wt porphine, more desirably about 0.3% to 1% wt/wt porphine, and even more desirably about 0.5% wt/wt porphine. Desirably, the amount of lanthanide in the colorant solution is from about 0.01% to 10% wt/wt lanthanide, more desirably about 0.03% to 1% wt/wt lanthanide, and even more desirably about 0.05% wt/wt lanthanide. Although europium and europium salts are desired lanthanides, other lanthanides, may also be used.

Although not wanting to be limited by the following hypothesis, it is theorized that, in addition to the protection provided by the polymeric membrane of the neonanoplasts, the above colorant stabilizing compounds act by quenching the excited state of a dye molecule within the neonanoplast by efficiently returning it to a ground state. This reduces the likelihood of an oxidative or other chemical reaction occurring, which would render the dye chromophore colorless.

The quenching process can occur by a number of processes. One such process is referred to as the heavy atom effect (internal or external) in which atoms with a high atomic number, such as iodine, xenon and lanthanides, can effect the excited electronic transitions of the dye molecule by allowing here to fore forbidden electronic transitions to occur and by decreasing the excited state lifetimes. This effect permits the rapid return of the dye to its ground state.

Another quenching process involves back electron transfer. In this case, quenching of the excited dye molecule occurs through sequential electron transfer. The additive or quencher, and dye form an ion pair through electron donation within which back electron transfer leads to an overall deactivation of the excited energy donor, i.e., the dye.

Another quenching process involves a condition in which the quencher (additive) molecule has an excited energy state lower than the excited dye. In this case, it may be possible to transfer the excited energy to the quencher thereby allowing the dye molecule to return to its ground state. These mechanisms are more fully discussed in *Chemistry and Light*, Suppan, P., Published by The Royal Society of Chemistry, 1994, pgs 65–69 which is incorporated herein by reference.

In some embodiments of the present invention, the colorant and/or colorant stabilizer within the neonanoplast is associated with a molecular includant. The term "associated" in its broadest sense means that the colorant and/or colorant stabilizer is at least in close proximity to the molecular includant. For example, the colorant and/or colorant stabilizer may be maintained in close proximity to the molecular includant by hydrogen bonding, van der Waals forces, or the like. Alternatively, the colorant and/or colorant stabilizer may be covalently bonded to the molecular includant, although this normally is neither desired nor necessary. As a further example, the colorant and/or colorant stabilizer may be at least partially included within the cavity of the molecular includant.

The molecular includant can be inorganic or organic in nature. In certain embodiments, the chemical structure of the molecular includant is adapted to form a molecular inclusion complex. Examples of molecular includants are, by way of illustration only, clathrates or intercalates, zeolites, and cyclodextrins. Examples of cyclodextrins include, but are not limited to, α-cyclodextrin, β-cyclodextrin, g-cyclodextrin, δ-cyclodextrin, hydroxypropyl-β-cyclodextrin, hydroxyethyl-β-cyclodextrin, hydroxyethyl-α-cyclodextrin, carboxymethyl-α-cyclodextrin, carboxymethyl-β-cyclodextrin, carboxymethyl-γ-cyclodextrin, octyl succinated-α-cyclodextrin, octyl succinated-β-cyclodextrin, octyl succinated-γ-cyclodextrin and sulfated β-cyclodextrin and sulfated γ-cyclodextrin (Cerestar U.S.A., Incorporated, Hammond, Ind.).

The term "derivatized cyclodextrin" as used herein means a cyclodextrin having more than two leaving groups covalently coupled to each molecule of cyclodextrin. The term "leaving group" is used herein to mean any leaving group capable of participating in a bimolecular nucleophilic substitution reaction. Examples of derivatized cyclodextrin includes, but is not limited to, hydroxypropyl-β-cyclodextrin, hydroxyethyl-β-cyclodextrin, hydroxyethyl-α-cyclodextrin, carboxymethyl-α-cyclodextrin, carboxymethyl-β-cyclodextrin, carboxymethyl-γ-cyclodextrin, octyl succinated-α-cyclodextrin, octyl succinated-β-cyclodextrin, octyl succinated-γ-cyclodextrin and sulfated β- and γ-cyclodextrin. A desired derivatized cyclodextrin is ethylhydroxy-β-cyclodextrin.

A desired molecular includant is γ-cyclodextrin. Another desirable molecular includant is β-cyclodextrin. In other embodiments, the molecular includant is an ethyl hydroxy β-cyclodextrin. Although not wanting to be bound by the following hypothesis, it is believed that the molecular includant inhibits the aggregation of the colorant molecule in solution. Other aggregation inhibitors that can be used in practicing the present invention are starches, pectins, amyloses, clathrates and the crown ethers. It is to be understood that the addition of derivatized cyclodextrins to a neonanoplast-forming solution for the purpose of inhibiting aggregation and/or stabilizing the dyes in the neonanoplast is considered one aspect of the present invention.

In addition to the colorant, optional colorant stabilizer, and optional molecular includant, the neonanoplasts of the present invention also may contain additional components, depending upon the application for which it is intended, as long as the additional component does not negatively effect the dye molecule. Examples of such additional components include, but are not limited to, charge carriers; stabilizers against thermal oxidation; viscoelastic properties modifiers; cross-linking agents; plasticizers; charge control additives such as a quaternary ammonium salt; flow control additives such as hydrophobic silica, zinc stearate, calcium stearate, lithium stearate, polyvinylstearate, and polyethylene powders; fillers such as calcium carbonate, clay and talc; surfactants; chelating agents; and TINUVIN® compounds; among other additives used by those having ordinary skill in the art. Charge carriers are well known to those having ordinary skill in the art and typically are polymer-coated metal particles. Desirable surfactants include, but are not limited to, $C_{12}$ to $C_{18}$ surfactants such as cetyl trimethyl ammonium chloride and carboxymethylamylose. TINUVIN® compounds are a class of compounds produced by Ciba-Geigy Corporation, which includes benzophenones, benzotriazoles and hindered amines. Desirable TINUVIN® compounds include, but are not limited to, 2-(2'-hydroxy-3'-sec-butyl-5'-tert-butylphenyl)-benzo-triazole, poly-(N-β-hydroxyethyl-2,2,6,6-tetramethyl-4-hydroxy-piperidyl succinate and 2-(2'-hydroxy-3',5'-ditertbutylphenyl)-5-chlorobenzotriazole. The identities and amounts of such additional components in the colored composition are well known to one of ordinary skill in the art.

Applications For The Neonanoplasts

The present invention is also directed to colorant compositions containing the above-described neonanoplasts. The colorant composition may comprise an aqueous or non-aqueous medium, although an aqueous medium is desirable. The colorant compositions of the present invention contain neonanoplasts, as well as, any of the above-described colorant stabilizers and additives. For example, the colorant composition may contain the above-described neonanoplasts in combination with any of the following additives: a second colorant; a colorant stabilizer, such as a porphine; a molecular includant; a pre-polymer; and any additional components as described above. The present invention is particularly useful for inks to be used in ink jet printers. Inks used in ink jet printers are described in U.S. Pat. No. 5,681,380, assigned to Kimberly Clark Worldwide, Inc., which is incorporated herein by reference in its entirety.

The colorant compositions of the present invention may be applied to any substrate to impart a color to the substrate. The surface tension of the neonanoplasts may be controlled to enable monolayer coatings of neonanoplasts on a substrate surface.

In one embodiment of the present invention, the colorant composition comprises neonanoplasts, a liquid medium, a pre-polymer and a photoinitiator. The colorant composition is coated onto a substrate and subsequently exposed to radiation to photocure the pre-polymer, fixing the neonanoplasts to the substrate via the polymerization of the pre-polymer. Suitable pre-polymers include, but are not limited to, acrylates, diacrylates, modified acrylates, triacrylates, pentaacrylates, methacrylates and cationic resins. Suitable photoinitiators include, but are not limited to, conventional photoinitiators, as well as, photoinitiators disclosed in U.S. Pat. No. 5,739,175; U.S. patent application Ser. No. 08/625,737; U.S. provisional patent application reference No. 11300-0420P, filed on May 07, 1998; and U.S. provisional patent application reference No. 11300-0450P, filed on Jun. 01, 1998; all of which are assigned to Kimberly Clark Worldwide, Inc., the entire content of which is hereby incorporated by reference.

The substrates to which the neonanoplasts may be applied include, but are not limited to, paper, wood, a wood product or composite, woven fabric, nonwoven fabric, textile, plastic, glass, metal, or any other substrate that would benefit from having a neonanoplast thereon. Examples of suitable substrates are disclosed in parent U.S. patent application Ser. No. 08/843,410, assigned to Kimberly Clark Worldwide, Inc., the entire content of which is hereby incorporated by reference. In one embodiment of the present invention, neonanoplasts are applied to a textile article, such as clothing. A very thin coating having a thickness of about one neonanoplast may be applied to a textile surface and subsequently fixed to the surface using a pre-polymer as described above. The resulting textile has excellent hand and drapeability, as well as, brilliant color due to the thin coating of neonanoplasts of the textile.

In another further embodiment of the present invention, neonanoplasts are present in a carrier, the nature of which is well known to those having ordinary skill in the art. For many applications, the carrier will be a polymer, typically a thermosetting or thermoplastic polymer, with the latter being the more common. Examples of suitable thermosetting and thermoplastic polymers are disclosed in parent U.S. patent application Ser. No. 08/843,410, assigned to Kimberly Clark Worldwide, Inc., the entire content of which is hereby incorporated by reference. One particularly suitable application is the incorporation of neonanoplasts into a polymer coating of a heat transfer product, such as is used for transferring graphic images onto clothing.

The present invention is further described by the examples which follow. Such examples, however, are not to be construed as limiting in any way either the spirit or scope of the present invention. In the examples, all parts are parts by weight unless stated otherwise.

EXAMPLE 1

Preparation of Magenta Neonanoplasts

To a 500 ml round bottom flask with stirring bar was added 200 mnl of hexane and 40 ml of Aerosol OT (dioctyl sodium sulfosuccinate; available from American Cyanamid). To this mixture was added 1.0 ml of an acrylamide (8 mg/ml) and N,N'-methylene bisacrylamide (Aldrich Chemical Company, Milwaukee, Wis.) (2 mg/ml) solution in water. To this mixture was added 20 μl of N,N,N',N'-tetramethylene diamine (Aldrich Chemical Company, Milwaukee, Wis.). The mixture was stirred and flushed with argon gas to remove oxygen.

In a separate container, an aqueous dye solution was prepared by adding 0.083 g of Rhodamine WT (Aldrich Chemical Company, Milwaukee, Wis.) to 10 ml of water and stirring for about 30 minutes. The aqueous dye mixture was then added to the reaction mixture and again flushed with argon gas for 1 hour. Then, 20 μl of a 80 mg/ml solution of ammonium persulfate was added to the flask. The reaction mixture was stirred under argon gas for 8 hours.

The hexane was then removed under reduced pressure to yield a syrupy liquid. The syrupy liquid was placed in dialysis bags (SIGMA, 10,000 MW cut off) and subjected to continuous dialysis for 2 days to remove the surfactant and any unencapsulated dye. The bags were then opened and the water removed to yield neonanoplasts in the form of a light magenta powder.

EXAMPLE 2

Preparation of Higher Concentrations of Magenta Neonanoplasts

The procedure of Example 1 was repeated using three different Rhodamine WT dye concentrations.

| Run | Grams of Rhodamine WT in 10 ml of Water | Moles of Rhodamine WT |
| --- | --- | --- |
| 1 | 0.25 | $5 \times 10^{-4}$ |
| 2 | 0.50 | $1 \times 10^{-3}$ |
| 3 | 1.0 | $1.9 \times 10^{-3}$ |

As the dye concentration increased, the resulting neonanoplasts had a deeper magenta color. All of the resulting neonanoplasts were filtered through a $0.45\mu$ filter without leaving a precipitate.

EXAMPLE 3

Preparation of Neonanoplasts Using Different Dyes

The procedure of Example 1 was repeated using other dyes.

| Run | Dye | Grams of Dye in 20 ml of Water | Moles of Dye |
| --- | --- | --- | --- |
| 1 | Victoria Blue bo | 0.4 | $1.33 \times 10^{-3}$ |
| 2 | Acid Red 52 | 0.3 | $1 \times 10^{-3}$ |

The resulting neonanoplasts in the form of a powder had a deep color. All of the resulting neonanoplasts were filtered through a $0.45\mu$ filter without leaving a precipitate.

Having thus described the invention, numerous changes and modifications thereof will be readily apparent to those having ordinary skill in the art, without departing from the spirit or scope of the invention.

What is claimed is:

1. A method of stabilizing a colorant, wherein the method comprises:
    encapsulating the colorant in neonanoplasts having an average particle size of less than about 1000 nm, wherein the neonanoplasts have an outer non-rupturable polymeric membrane which is formed within a dispersed aqueous phase of a two-phase system;
    wherein the two-phase system comprises a first nonaqueous phase, a dispersed aqueous phase, and a surfactant;
    and wherein the polymer comprising the polymeric membrane is formed from a water-soluble monomer and a water-soluble initiator.

2. The method of claim 1, wherein the neonanoplasts have an average particle size of less than about 500 nm.

3. The method of claim 2, wherein the neonanoplasts have an average particle size of less than about 100 nm.

4. The method of claim 1, wherein the outer polymeric membrane is formed by a polymerization step within the aqueous phase, said polymerization step involving a reaction between one or more water-soluble reactants selected from one or more monomers, one or more initiators, and one or more chain transfer agents.

5. The method of claim 1, wherein at least one colorant stabilizer is associated with the colorant and encapsulated by the neonanoplasts.

6. The method of claim 5, wherein the at least one colorant stabilizer is selected from a porphine, a metal, a metal salt, a molecular includant or a combination thereof.

7. The method of claim 6, wherein the porphine is represented by the following formula

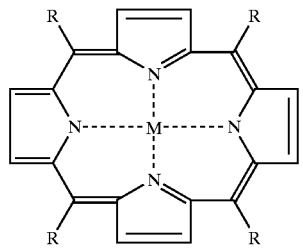

wherein M is iron, cobalt or copper; and wherein R is $SO_3H$,

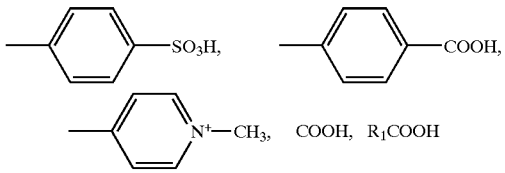

wherein $R_1$ is an alkyl group of from 1 to 6 carbons, or a salt thereof.

8. The method of claim 7, wherein the porphine is Cu-meso-tetra-(4-sulfanatophenyl)-porphine or Cu-meso-tetra-(N-methyl-4-pyridyl)-porphine, having the following structures, respectively:

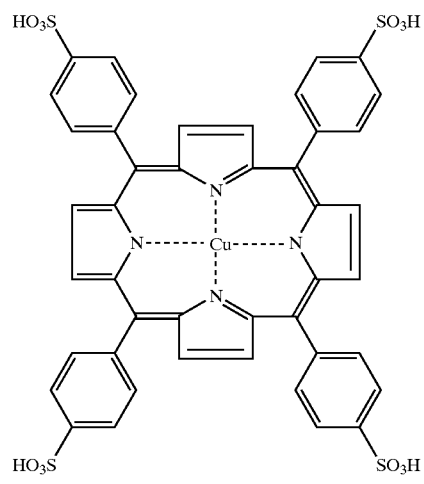

or

-continued

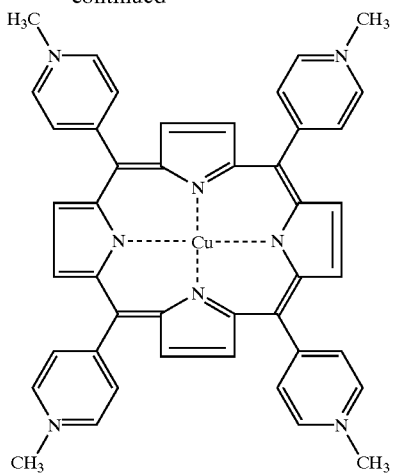

or the porphine is Co-meso-tetra-(4-sulfanatophenyl)-porphine or Co-meso-tetra-(N-methyl-4-pyridyl)-porphine, having the following structures, respectively:

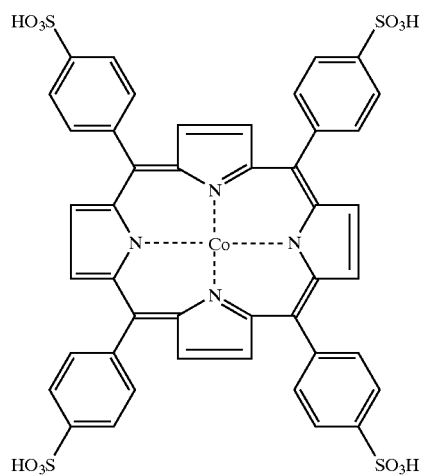

or

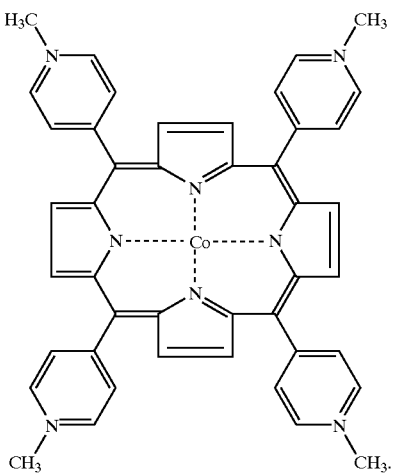

9. The method of claim 6, wherein the metal or metal salt comprises a lanthanide or lanthanide salt.

10. The method of claim 6, wherein the molecular includant is one or more cyclodextrins.

11. The method of claim 10, wherein the one or more cyclodextrins comprise α-cyclodextrin, β-cyclodextrin, γ-cyclodextrin, δcyclodextrin, hydroxypropyl-β-cyclodextrin, or hydroxyethyl-β-cyclodextrin.

12. A method of stabilizing a colorant comprising:

encapsulating the colorant in a non-rupturable polymeric membrane to form a neonanoplast, wherein the polymeric membrane is formed within a dispersed phase of a two-phase system;

wherein the two-phase system comprises a first nonaqueous phase, a dispersed aqueous phase, and a surfactant;

and wherein the polymer comprising the polymeric membrane is formed from a water-soluble monomer and a water-soluble initiator.

13. The method of claim 12, further comprising associating at least one colorant stabilizer with the colorant.

14. The method of claim 13, wherein the at least one colorant stabilizer is selected from a porphine, a metal, a metal salt, a molecular includant or a combination thereof.

15. The method of claim 14, wherein the porphine is represented by the following formula

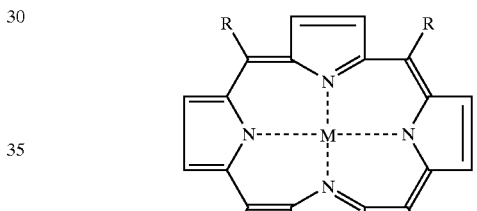

wherein M is iron, cobalt or copper; and wherein R is $SO_3H$,

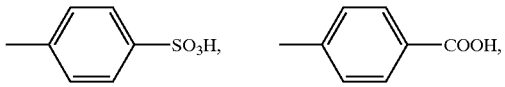

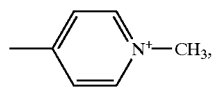

COOH, $R_1$COOH wherein $R_1$ is an alkyl group of from 1 to 6 carbons, or a salt thereof.

16. The method of claim 15, wherein the porphine is Cu-meso-tetra-(4-sulfanatophenyl)-porphine or Cu-meso-tetra-(N-methyl-4-pyridyl)-porphine, having the following structures, respectively:

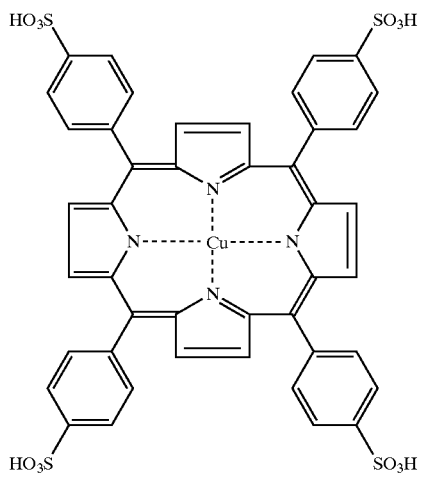

or

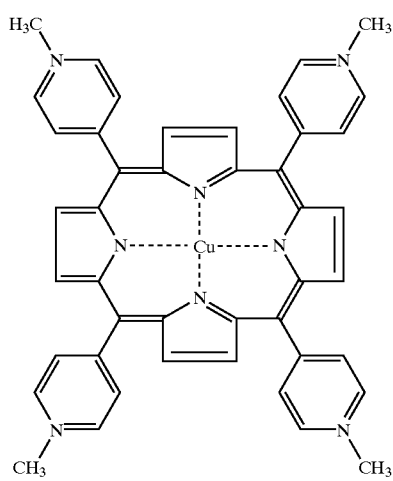

or the porphine is Co-meso-tetra-(4-sulfanatophenyl)-porphine or Co-meso-tetra-(N-methyl-4-pyridyl)-porphine, having the following structures, respectively:

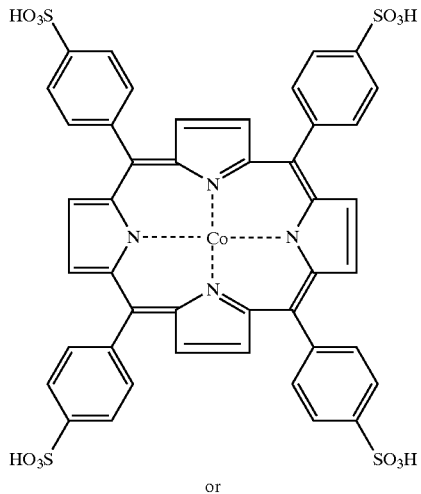

or

-continued

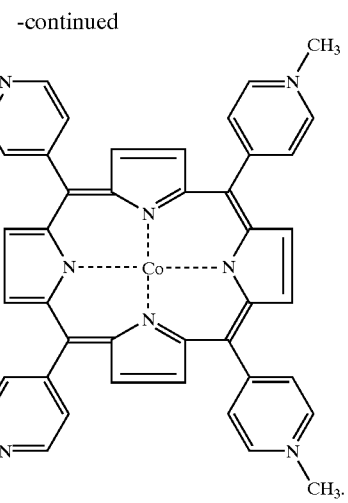

17. The method of claim 14, wherein the metal or metal salt comprises a lanthanide or lanthanide salt.

18. The method of claim 14, wherein the molecular includant is one or more cyclodextrins.

19. The method of claim 18, wherein the one or more cyclodextrins comprise α-cyclodextrin, β-cyclodextrin, γ-cyclodextrin, δ-cyclodextrin, hydroxypropyl-β-cyclodextrin, or hydroxyethyl-β-cyclodextrin.

20. The method of claim 13, wherein the neonanoplast has an average particle size of less than 500 nm.

21. The method of claim 13, wherein the colorant is in an aqueous phase.

22. The method of claim 13, wherein the colorant is associated with a molecular includant.

23. The method of claim 22, wherein the molecular includant is one or more cyclodextrins.

24. The method of claim 23, wherein the one or more cyclodextrins comprise α-cyclodextrin β-cyclodextrin, γ-cyclodextrin, δ-cyclodextrin, hydroxypropyl-β-cyclodextrin, or hydroxyethyl-β-cyclodextrin.

25. The method of claim 13, wherein the polymeric membrane is formed from at least one monomer.

26. The method of claim 25, wherein the at least one monomer comprises an acrylate, an acrylamide, a methacrylate, or a combination thereof.

27. The method of claim 13, wherein the colorant comprises a dye a or a pigment.

28. The method of claim 27 wherein the colorant comprises a dye.

29. The method of claim 13, wherein the colorant is associated with one or more charge carriers; stabilizers against thermal oxidation; viscoelastic properties modifiers; cross-linking agents; plasticizers; charge control additives; flow control additives; fillers; surfactants; chelating agents; benzophenones; benzotriazoles; or hindered amines.

30. The method of claim 12, wherein the polymeric membrane is formed within the dispersed aqueous phase from one or more water-soluble reactants.

31. The method of claim 30, wherein the one or more water-soluble reactants comprise at least one monomer, at least one initiator, at least one chain-transfer agent, or a combination thereof.

32. The method of claim 31, wherein the one or more water-soluble reactants comprise at least one monomer, at least one initiator, and at least one chain-transfer agent.

33. The method of claim 12 further comprising:
separating the dispersed aqueous phase from the two-phase system;
removing the surfactant; and
separating the neonanoplast from the aqueous phase.

34. The method of claim 12, wherein the neonanoplast has an average particle size of less than about 1000 nm.

35. The method of claim 12, wherein the neonanoplast has an average particle size of less than about 500 nm.

36. The method of claim 12, wherein the neonanoplast has an average particle size of less than about 100 nm.

37. A method of stabilizing a colorant, wherein the method comprises:
forming an aqueous mixture comprising at least one water-soluble monomer and at least one water-soluble colorant;
dispersing the aqueous mixture in a two-phase system comprising a non-aqueous solution, the dispersed aqueous mixture, and a surfactant;
adding at least one water-soluble initiator to the two-phase system to initiate a polymerization step within the dispersed aqueous mixture; and
encapsulating the at least one water-soluble colorant in neonanoplasts having an outer non-rupturable polymeric membrane formed in the polymerization step.

38. The method of claim 37, wherein the neonanoplasts have an average particle size of less than about 1000 nm.

39. The method of claim 38, wherein the neonanoplasts have an average particle size of less than about 500 nm.

* * * * *